(12) United States Patent
Bousseton et al.

(10) Patent No.: US 8,812,959 B2
(45) Date of Patent: Aug. 19, 2014

(54) METHOD AND SYSTEM FOR DELIVERING DIGITAL CONTENT

(75) Inventors: Sebastien Bousseton, La Gaude (FR); Jean-Luc Collet, La Gaude (FR); Arnaud Lund, Cagnes-sur-mer (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 12/781,108

(22) Filed: May 17, 2010

(65) Prior Publication Data
US 2010/0332993 A1 Dec. 30, 2010

(30) Foreign Application Priority Data
Jun. 30, 2009 (EP) .................................... 09305631

(51) Int. Cl.
*G06F 3/00* (2006.01)
(52) U.S. Cl.
USPC ........... 715/749; 715/738; 715/742; 715/760; 726/28; 380/281; 380/284; 380/286
(58) Field of Classification Search
USPC .................... 715/749, 760, 738, 742; 726/28; 380/281, 284, 286
See application file for complete search history.

(56) References Cited

U.S. PATENT DOCUMENTS

| 5,893,160 | A * | 4/1999 | Loewenstein et al. | 711/152 |
|---|---|---|---|---|
| 6,404,441 | B1 * | 6/2002 | Chailleux | 715/704 |
| 7,089,425 | B2 * | 8/2006 | Chan | 713/189 |
| 7,519,179 | B2 * | 4/2009 | Shiina | 380/44 |
| 7,634,091 | B2 * | 12/2009 | Zhou et al. | 380/277 |
| 8,234,217 | B2 * | 7/2012 | Derrenberger | 705/51 |
| 2001/0056351 | A1 * | 12/2001 | Valentine et al. | 704/270 |
| 2002/0007393 | A1 * | 1/2002 | Hamel | 709/203 |
| 2003/0120605 | A1 * | 6/2003 | Fontana et al. | 705/59 |
| 2004/0187027 | A1 * | 9/2004 | Chan | 713/201 |
| 2005/0002532 | A1 * | 1/2005 | Zhou et al. | 380/277 |
| 2005/0036612 | A1 * | 2/2005 | Shiina | 380/44 |
| 2005/0114683 | A1 * | 5/2005 | Jin et al. | 713/187 |
| 2008/0148228 | A1 * | 6/2008 | Dawson | 717/115 |
| 2008/0229425 | A1 * | 9/2008 | Perrin et al. | 726/26 |
| 2009/0132823 | A1 * | 5/2009 | Grimen et al. | 713/171 |
| 2009/0158051 | A1 * | 6/2009 | Michiels et al. | 713/189 |
| 2010/0325431 | A1 * | 12/2010 | Mordetsky et al. | 713/167 |
| 2010/0325446 | A1 * | 12/2010 | Mordetsky et al. | 713/190 |

* cited by examiner

Primary Examiner — Shen Shiau
(74) Attorney, Agent, or Firm — Douglas A. Lashmit; Hoffman Warnick LLC

(57) ABSTRACT

A method, computer program, and system for delivering digital content to a user interface. A method according to an embodiment includes: generating a starting content on the user interface including at least one clickable content, each of the at least one clickable content being previously associated with a first key; upon selection of a clickable content associated with a first key, determining a second key, associated with a destination content, from the first key; determining an executable asset program from the second key, an execution of the asset program generating the display of a predefined asset content; attaching the second key to the executable asset program according to a hiding mechanism; executing the executable asset program to display the predefined asset content, and releasing the second key during the execution of the program.

19 Claims, 11 Drawing Sheets

| URL | KEY_1 | Time stamp |
|---|---|---|
| http://www.content1.com/page1 | 067093864554 | 23-10-2009:06:00:29:256 |
| http://www.content2.com/page2 | 536489059876 | 18-11-2008:06:15:29:544 |

Fig. 6a

| URL | KEY_1 | KEY_2 | Time stamp |
|---|---|---|---|
| http://www.content1.com/page1 | 067093864554 | 09864778308 | 23-10-2009:06:00:29:256 |
| http://www.content2.com/page2 | 536489059876 | 98789755546 | 18-11-2008:06:15:29:544 |

Fig. 6b

METHOD AND SYSTEM FOR DELIVERING DIGITAL CONTENT

FIELD OF THE INVENTION

The present invention generally relates to data processing, and more particularly to systems and methods for delivering digital content such as advertising content.

RELATED ART

The business model of many companies on the Internet mostly depends on the display of advertisements on the client web browser. The rise of solutions enabling the blocking or skipping of such ads greatly endangers this mainstream source of revenue. Search engines are particularly at risk.

Advertisements represent a major source of revenue for many websites and companies (e.g., providers of search engines or newspaper sites). If advertisements were to be massively rejected (and even "well targeted", effective or informative ads of major companies), there would be no more free content or services anymore. Currently, only the most technically proficient users are aware of such adblocking techniques but a default integration of such tools in mass-market web browsers or desktop clients would result in huge losses for companies whose business models rely on advertisement. There is a need to secure the display of advertisements on web browsers, to prevent the growing use of adblocking techniques.

Advertisements comprise, for example, digital content such as text areas, still images, animated images or even videos embedded in web pages. When a member of the advertising audience (referred to as a "viewer" or "user" without loss of generality) selects one of these ads by clicking on it, embedded hypertext links typically direct the viewer to the advertiser's website ("click-through" process).

It appears that more and more consumers want to avoid intrusive marketing. They declare to be saturated by highly distracting ads, though some industry players try to leverage "non-annoying" and "informative" ads. Indeed, there are very few simple, easy to read, non-intrusive, text advertisements. Instead, ads are often flash or animated gif banners which users feel to be too invasive (e.g., pop-ups, pop-unders, and the like sometimes cover the desirable contents). For example: flashing graphics make it very hard to read real text elsewhere on the page; most of the time ads that are delivered are not appropriate (so-called "targeted ads" often fail); and they are consider as distracting the reader with "noise". The targeting of users may also imply to track habits and to threaten privacy.

For these and other reasons, more and more users use so-called adblockers (or ad-blockers). From the users' point of view, adblocking benefits include cleaner-looking web pages, lower resource-usage (bandwidth) and the loading of pages is said to be speeded-up (many pages are designed to load heavy ads first).

The state of the art comprises adblocking techniques enabling the skipping or removal of advertisements on web browsers, such as pure text browsers, pop-up blockers (or pop-under), blacklists of URLs of ad servers, text filtering tools (based on keywords, to prevent ad files from loading), script blockers, use of CSS rules (to hide specific HTML and XHTML elements), etc.

On the reverse side (i.e., secure the display of advertisements), it appears that there are very few efficient technical solutions available. Aside from technical approaches, there are rather quite non-technical methods. For example, permission marketing methods are tested (indeed, users may target ads instead of ads targeting users), but these methods do not apply well to mass markets. Other methods based on users profiling have been tried by advertisers or their partners to deliver better perceived forms of advertisements, but it poses privacy threats. If no reliable solution emerges to secure the display of advertisements, advertising formats may evolve to contextual, interactive, permission-based and targeted messaging to retain consumers' attention and to help minimize both irritation and "tuning out." A few content or service providers also try to warn their users on damages implied by the use of adblocking techniques by arguing that it takes revenue out of the people that work hard to provide them content and services. Sometimes they require a specific license agreement for visiting their websites. In conclusion, none of these (non-technical) methods succeed to effectively act as countermeasures to adblocking techniques and/or the use of RSS feeds and/or the use of personalised web pages, and in fine, to secure revenues streams.

There is an need for a method for securing the display of advertisements on web browsers, and more generally of handling advertising content.

SUMMARY OF THE INVENTION

There is disclosed a method for delivering digital content to a user interface. The method includes: generating a starting content on the user interface including at least one clickable content, each of the at least one clickable content being previously associated with a first key; upon selection of a clickable content associated with a first key, determining a second key associated with a destination content from the first key; determining an executable asset program from the second key, an execution of the asset program generating a display of a predefined asset content; attaching the second key to the executable asset program according to a hiding mechanism; executing the executable asset program to display the predefined asset content; and releasing the second key during the execution of the executable asset program.

The clickable content can be a URL (Uniform Resource Locator), an image with a hyperlink, a clickable portion of a video, a selectable 3D object in a 3D or holographic scene. The release of the second key can occur at different temporal instants. The executable asset program may be an auto-executable program. It may be in a binary form. It may also be an open source program (the set of instructions or the program code being available one way or another). It is tied to the second key. In an embodiment, the release of the key occurs upon the termination of the execution of the executable asset program. According to other embodiments, the release intervenes after essential parts of the predefined asset content have been displayed (the display may then not be considered to be fully terminated). Yet according to other embodiments, the release of the second key may occur before the predefined asset content is displayed (this corresponds to cases wherein there is trust or confidence that the predefined asset content will be displayed and viewed by the user. For this reason the proposed method can be disallowed to hasten response time and further retrieval of destination content.

According to an embodiment, the method further includes displaying the destination content associated with the second key. The access to the destination content is indirect and conditional. It is observed that the destination content can be rendered in or by the program ("within the program"). Alternatively, the destination content may be rendered by another entity of the architecture (for example the web browser or mark-up file or digital content viewer).

In an embodiment, the hiding mechanism includes inserting the second key in the executable asset program code. In another embodiment, the second key is just inserted, providing a very simple solution to implement the method.

The hiding mechanism may include obfuscating or intricating the second key in the executable asset program code. According to another embodiment, obfuscation mechanisms are implemented. Such obfuscation mechanisms reinforce robustness against adblockers.

In an embodiment, the hiding mechanism determines the executable asset program code to calculate during execution of the second key. According to some embodiments, the second key is known by the entity delivering the digital content and no other entity knows about the second key. The second key can be the result of computation or a series of calculations performed by the executable asset program. In other words, the program can be chosen, or generated or determined in a manner such that the execution will provide the second key, during its execution or at its termination.

There is disclosed a method wherein the predefined asset content comprises audio, image or video content which is displayed during a predetermined duration. The predefined asset content is advertising content in an embodiment (but it is not limited to content of this nature). For example it can be legal disclaimers, quizzes or challenges, payment screen, registration form, etc.). The predefined asset content may be (pure) audio, such as music or sounds, (still or animated) image, video (short clip or a full length movie), etc. The predefined asset content can be predetermined but it can also be generated on the fly according to a user profile. The predefined asset content can render parts of the destination content combined with parts of certain advertising content. According to other embodiments, the predefined asset content may be displayed during different temporal durations.

There is disclosed a method wherein the executable asset program is adapted to display the predefined asset in a full-screen mode. According to a certain embodiment, the predefined asset content is displayed on a surface of display which can cover the full angle of vision of the user, at least all the available surface being responsive to or under the control of the command system in which is implemented the method. The display can be much bigger than the display of the starting page.

There is disclosed a method wherein the executable asset program is adapted to display the predefined asset content in a mode visually hiding one or a plurality of areas of the user interface display. Alternatively, the predefined asset content may be displayed on a surface which may be smaller than the starting page. Yet alternatively, the predefined asset content can selectively cover a certain number of areas of the user interface, even disjoined areas. Fast forward graphical buttons or commands can be (visually) hidden, for example, providing an increased control of the interactivity of the page.

Embodiments of the invention use a combination of several techniques to secure the display of one or a plurality of particular regions or surfaces or pieces or areas of interest in or of the interpreted or executed markup file or digital content: (a) techniques of removing any explicit references to the desired content or destination content; (b) the use of software applets or widgets or hardened program technologies; (c) exchanges of keys keeping secret or obscure particular knowledge; (d) the optional use of the generation of images displayed through the executable asset program and the further alterations of the images for leveraging the technological limitations of image recognition and text analysis techniques (such as OCR). This will be later described.

Among many advantages, certain embodiments of the invention defeat most existing semantic or text analysis techniques (which technologies could possibly be used to block or skip advertisements). Advertisements are not solely involved: embodiments of the invention address every situation wherein one or a plurality of particular areas (such as text or graphics) needs to be secured (need for preserving the integrity of displayed data).

Another benefit of an embodiment of the invention also lies in its ability to avoid any execution of malicious code (if any) for the web browser. According to some embodiments, the invention indeed provides an interesting protection against malicious software. The Internet today is infested with dangers, among which is malicious software code. A user visiting a web page with a web browser may inadvertently execute malicious code, endangering the user's local machine (immediately or in the near future). The generic malicious code comprises a virus, Trojans later downloading and installing keyloggers, spyware, etc. Private and financial data are then at risk, and the hardware device itself may be physically damaged, if not remotely used for illegal purposes. Using the described method according to some embodiments, eventual possible malicious code is executed within the program of the considered method. It benefits from its own security mechanisms (the web browser does not receive additional mark-up pages with unreliable code, but modified mark-up files containing applets with limited privileges). Quite surprisingly, malware and advertising are tied: malicious code is said to be massively injected through online advertising, due to the complex structure of business relationships (injection of malicious content into legitimate advertising delivery streams). In an embodiment of the invention, a the Java applet renders the complete (entire) page and secures the display of advertisements and at the same time avoids malicious code execution. The web browser has the guarantee not to execute any malicious code while the content provider has the guarantee to secure its advertisements. It is a "win-win" operation that opens many interesting business opportunities.

Another advantage of embodiments of the invention is that only a standard browser provided with Java applets execution capability (or executable program execution capability) is required. No additional plug-in, components or local software on the client side may be required. Today, regarding Java applets, due to the wide use of Java, the implementation of embodiments of the invention may be very easy, hence adoption may be immediate.

Yet another advantage of embodiments of the invention is that it enables faster Internet access.

Another advantage of embodiments of the invention is that it defeats content extraction techniques. Embodiments of the invention avoid and eliminate many possibilities for skipping ads. For example, without the invention, the use of extraction techniques for building personalized web pages, the use of RSS, and the use of mashups may enable the skipping of advertisements. The use of personalized web pages, for example, enables the extraction of precise content areas and the gathering of the extracted content in personalized pages. Thereafter, the user does not need to visit the original page again, thus skipping advertisements if any. A similar technique relies on loading entire pages and displaying them only with frames and/or <DIV> tags, hiding unwanted content (masking techniques). This last possibility also presents the drawback of leaving the number of unique visitors unchanged (from the advertiser's point of view), though content are not even displayed to the user. With RSS feeds (RSS stands for "Really Simple Syndication"), similar mechanisms do operate. Indeed, the rise of RSS feeds has deeply changed the nature of the Internet, which is not anymore a stock of data but flows of data. It is important to notice that according to this RSS model, content providers do control feeds, meaning they can choose what content to offer to their subscribers, through RSS feeds. Again, thanks to emerging mechanisms, it is now possible for users to freely extract parts of web content, without any limitations. In other words, web users do not need to visit bottleneck pages anymore (home pages or portals containing lots of ads). In this context, content providers may be reduced to providers of raw data, with very few choices for monetizing their business. For example, a technique (sometimes called RSS Generator) enables feeds to be extracted from any web page. Yet other techniques allow not only the gathering of RSS feeds, but also the combination of RSS feeds (RSS Remixer tools enable filtering, searching, mixing, etc.). There have been some attempts to embed targeted ads into syndicated feeds (an ad would be served in an RSS item or blog post containing keywords that an advertiser has preselected) but text filtering (keywords-based or involving other techniques) may defeat this. At last, the use of so-called mashups also poses a threat to online advertising. Thanks to APIs (Application Programming Interfaces), applications themselves can also be aggregated or mixed. And in particular, advertisements may be removed during the remixing of contents.

Embodiments of the invention avoid and eliminate all the above possibilities for skipping ads, since content is "crystallized" or "frozen" in programs, with few if no modification possibilities. It is difficult to develop a new browser; it is very easy to generate small programs according to embodiments of the invention.

According to another embodiment of the invention, there is at last provided a computer program, a computer readable medium and a system for implementing the method.

Further advantages of the invention will become clear to the skilled person upon examination of the drawings and detailed description. It is intended that any additional advantages be incorporated therein.

BRIEF DESCRIPTION OF THE DRAWINGS

Embodiments of the invention will now be described with reference to the following drawings.

To facilitate description, any numeral identifying an element in one figure will represent the same element in any other figure.

DETAILED DESCRIPTION OF THE INVENTION

The following text presents embodiments in the context of digital content and in particular of advertising content but it is to be understood that it is not limited to this specific context or type of content. For example, it extends equally to any type of content (such as disclaimers, warning notices, etc.). The content displayed by the generated program is intended to be any type of content: still image, video, 3D, music, sounds, interactive programs, etc.

Embodiments of the invention provide useful teachings to domains such as computer security (malicious code removal, anti-crawling tool, etc.), internet accessibility, content personalization and edition, data conversion, Software as a Service delivery, Digital Rights Management, Trusted Computing, etc.

It is to be underlined that embodiments of the invention involve programs, which term must be understood broadly. Such programs constitute barriers to analysis and reverse engineering. Any situation wherein a second program intervenes within and/or sideways to a first program (the browser or the viewer) and wherein a dynamic linking between the two shall intervene will profit from embodiments of the invention.

Figure 1:
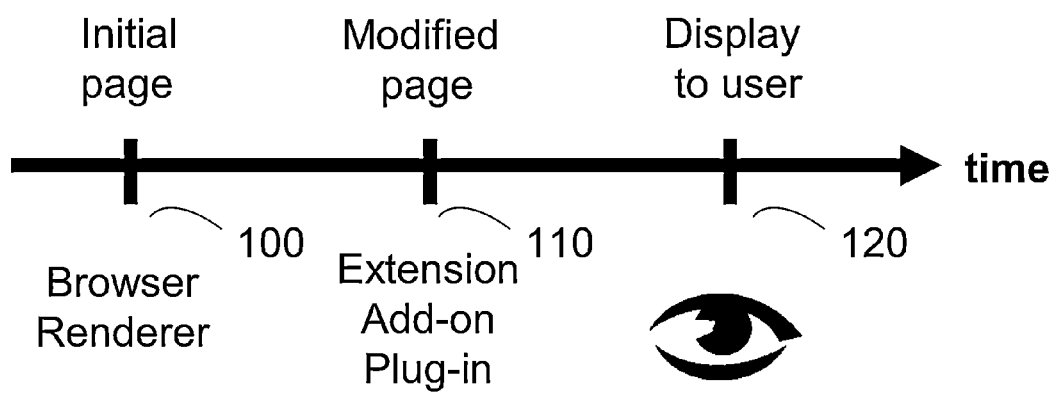
FIG. 1 illustrates the rendering process of content in a mark-up file viewer environment (role of adblockers).

FIG. 1 illustrates the rendering process of content in a mark-up file viewer environment (role of adblockers).

FIG. 1 illustrates a timeline from left to right, in which three events are represented. A mark-up file viewer (for example a web browser) first renders an initial page at step 100. An extension (add-on, plug-in, hardware component, etc.) modifies one or a plurality of content/elements and the arrangement/layout of the initial page. A modified page is created at step 110. Then, at step 120, the light emitted by the display device reaches the retina of the user.

Adblockers, implemented in the form of browser add-ons or plug-ins, often intervene at the very end of the rendering sequence. For example, a page of a newspaper containing several ads is parsed and rendered by the browser at step 100. At step 120, the plug-in or add-on modifies the page and ads are removed. This final control may be found in many situations, even with SSL sessions, for example. In a secure connection with a bank, no mechanism prevents a given browser extension or add-on at step 110 from modifying again the page after data is decrypted for displaying purposes.

Today, browser's extensions, add-ons or plug-ins (may/often) have the final word in the rendering sequence. They are provided with content analysis means. At any time, they can intercept, analyse and block undesirable contents. Embodiments of the invention precisely enable the elimination of the action of such adblockers, because these adblockers cannot intervene on generated programs according to the present method. The adblockers may even not be aware of the existence of running executable asset programs. Embodiments of the invention provide a control on the (indirect) access to digital contents via programs.

Figure 2:
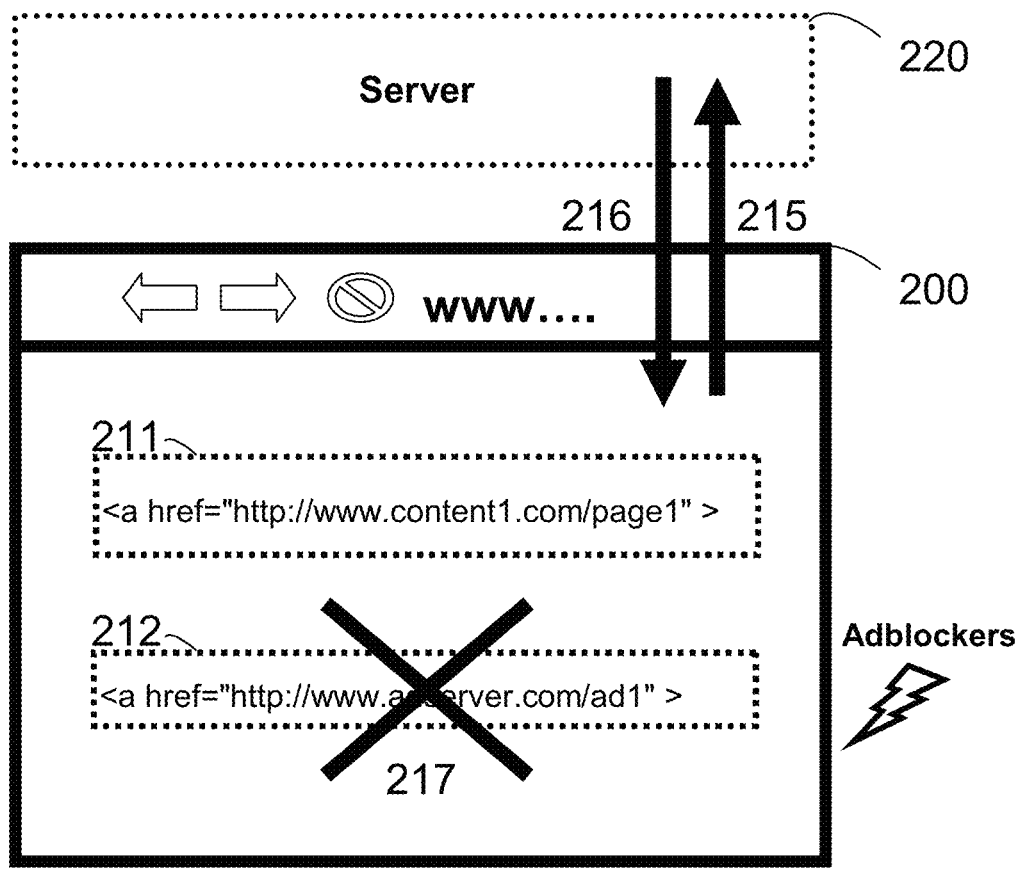
FIG. 2 illustrates the action of content filters or adblockers (prior art).

FIG. 2 illustrates the action of content filters or adblockers (prior art).

The figure shows a typical situation of the prior art. A web browser 200 communicates with a server 220 delivering digital content upon requests of the browser.

At step 215, a user queries a search engine at www.search.com (for example). The user is presented an interface 200 that allows the user to send a query for a keyword. The query 215 is in fact an HTTP request sent to the search or content server. Supposing the user searches for a word "KEYWORD", the HTTP request will be similar to something like http://www.search.com/search?hl=fr&q=KEYWORD&meta=&aq=f&oq=. The search server 220 will return back a web page at step 216 containing links to the web pages such as:

```
<a href="http://www.content1.com/page1" > (illustrated as 211)
<a href="http://www.content2.com/page2" > (not shown)
``` and may also comprise links in the page (or in linked web pages themselves) to some advertisements such as:
```
<a href="http://www.adserver.com/ad1"> (illustrated as 212)
```
The adblocker will analyze the contents of the page and/or links (prefetching contents, analyzing content and available metadata) and will remove the advertisement link at step 217. This removal will be performed locally, on the browser side. The target content or final or destination content will not be requested (or the content will be retrieved but filtered out before the rendering of the resulting page, i.e., not displayed). In the end, the server has no means to know if the advertisement has been effectively displayed or not. The retrieval of pages will be counted in logs but nothing is provided to ensure that a given element has been effectively displayed in front of the user. The advertisement content having being removed, one way or another, the remaining links or contents will be the original links to the contents the user was looking for.

Figure 3:
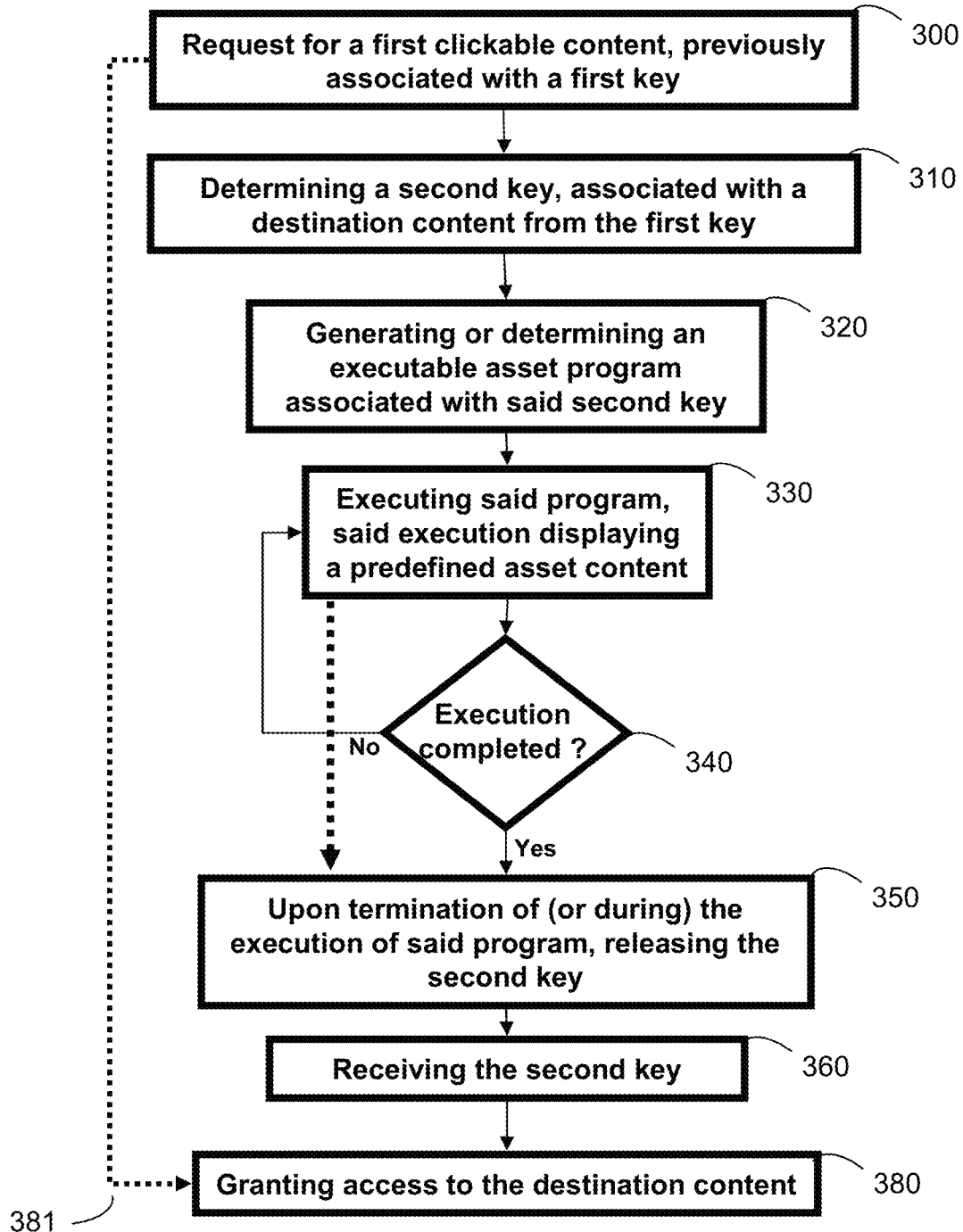
FIG. 3 shows the general principle of the invention.

FIG. 3 shows the general principle of the invention.

FIG. 3 proposes an exemplary workflow of a method according to a certain embodiment of the invention. Different steps are proposed. It is underlined that many alternatives are available, so that many system indications are completely and definitively optional.

Figure 10:
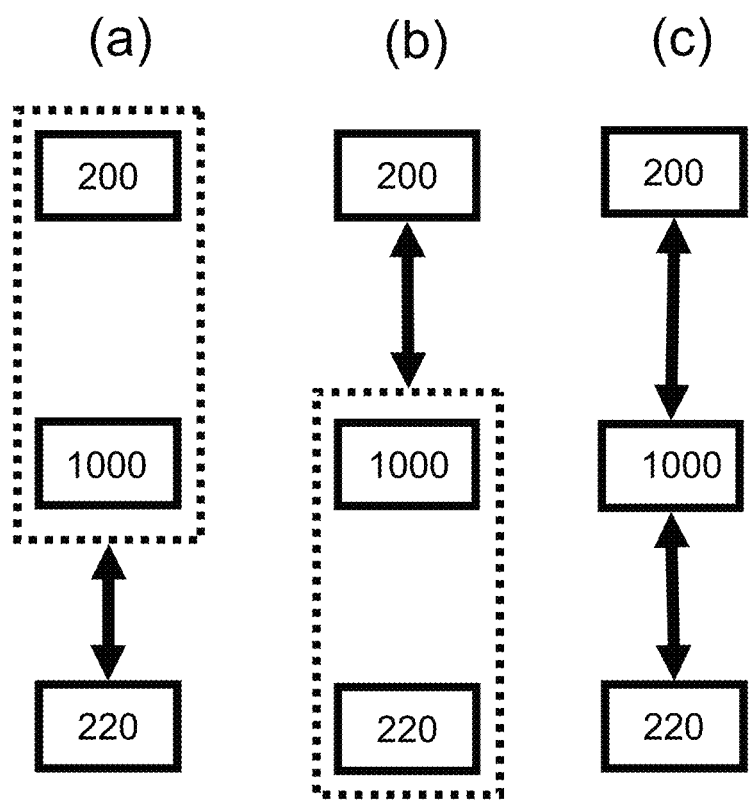
FIG. 10 discusses architecture options.

FIG. 10 discusses in details these options (browser, proxy, server).

There is generated a starting content on the user interface including at least one clickable content, each of the at least one clickable content being previously associated with a first key (not shown on the figure). At step 300, a first clickable content is requested or selected, for example by a web browser to a web server. At step 310, a second key is determined, associated with a destination content from the first key. The first clickable content is found or determined or calculated to be associated with a first key by a proxy. A second key is then found or determined or calculated to be associated with the first key, for example by the proxy server. The first key being associated with a destination content. Alternatively, the second key is associated with a destination content. Alternatively, the three elements (first key, second key and destination content) can be previously associated. At step 320, an executable asset program is generated and associated or somehow tied or related with the second key. A program is generated. The program is a executable asset program. It comprises set of instructions, lines of code (program code). It is generated on the fly, given the key. Alternatively the program (in short) is chosen among a plurality of programs in a library or a database of programs. The web server (or a proxy server) can generate the executable asset program. The program incorporates, includes, embeds or comprises the second key in its code (set of machine executable instructions) or is able to release this second key post calculation, or as a result of a challenge or test asked or posed to the user. The second key can be created at the step of the generation of the program but it can be predetermined. The second key is being inserted/hidden/intricated/obfuscated in the code (alternatively the program is generated such that it will output the second key when executed).

The generated or determined executable asset program may use obfuscation techniques. Obfuscated code is a code which has been made difficult to understand, to conceal its purpose or to deter reverse engineering. The terms "shrouded code" or "hardening applications" are also used. Obfuscating code manages risks that stem from unauthorized access to the code. In the future, adblockers programs may indeed evolve in this direction, trying to extract keys from the program to get control over contents. Obfuscation limits this risk and serves as a preemptive countermeasure. Obfuscating code can be performed by using various techniques such as (but not limited to) encryption, obfuscation of routines statically linked into the obfuscated program, tamper detection and response, use of virtual machines, etc. An example is pointed out in the White Paper entitled "The Ghost in the Browser" by Provos, McNamee, Mavrommatis, Ke Wang and Nagendra Modadugu (Google, Inc), as the following JavaScript:

```
<SCRIPT language=JavaScript> Function otqzyu(nemz)juyu="lo";sdfwe78="catio";
kjj="n.r";vj20=2;uyty="eplac";iuiuh8889="e";vbb25="(";awq27="";sftfttft=4;fghdh="'ht";ji8
7gkol="tp:/";polkiuu="/vi";jbhj89="deo";jhbhi87="zf";hgdxgf="re";jkhuift="e.c";jygyhg="om'
";dh4=eval(fghdh+ji87gkol+polkiuu+jbhj89+jhbhi87+hgdxgf+jkhuift+jygyhg);je15="')";if
(vj20+sftfttft==6) eval(juyu+sdfwe78+kjj+
uyty+iuiuh8889+vbb25+awq27+dh4+je15);otqzyu( );//
</SCRIPT>
``` by de-obfuscating, the following instruction is revealed: location.replace('http://specificwebsite.com')

When executing the above Javascript, the browser is automatically redirected to specificwebsite.com, which site can then display predetermined content such as an advertisement.

Obfuscation can also use different levels of wrapping. To unveil each layer, the use of a different application may be required. Each layer comprises another layer of Javascript escaped code. In the end, a script may be generated to download a binary onto the users computer. It is thus very unlikely that adblockers are provided with embedded de-obfuscation mechanisms or sufficient capabilities. Using such optional hardening techniques thus allows efficient hiding of the key and/or the address of the first desired content or destination content in the code of the program, impeding any third party from analyzing the code, retrieving the key or the address, and to bypassing the execution of the program. According to certain embodiments of the invention, these obfuscation techniques are combined with the exchanges of keys.

Alternatively, it is only when the program executes that the second key is generated. In this case, because the key generation is performed locally (on the browser), it may be required to have a communication channel with the server or proxy or entity having the knowledge of the correspondences between keys and contents. For this reason, to avoid the need for such a communication channel, in an embodiment the second key is created during the generation of the program and included and protected in the set of instructions of the generated program. According to other embodiments, the second key is hidden in the set of instructions. Various means can be used to hide this key or data. Alternatively, the key can be the result of computations/calculations (it may take into account the first key or being completely independent from it). The calculation can occur at the very end of the execution the program (the set of instructions can be such to obtain this result for example). Alternatively, it can occur at another moment. In an embodiment, the proxy server does generate the program but it is observed that other entities in the architecture can generate such a program. A combination of sub-programs is also possible, such as a dynamic combination of these sub-programs.

At step 330, the executable program is executed, the execution displaying a predefined asset content. In other words, the generated program (in this example, comprising/protecting the second key) executes. This execution displays in front of the screen a second content or a predefined asset content. The content may have been predetermined (or not). For example, a predetermined advertisement is displayed. It is observed that the second content (or predefined asset content) can be any kind of content (the program presents many degrees of freedom form this point of view). The second content can be a still image, a video, 3D objects, an interactive program posing questions or challenges, etc. The program renders a window (like a pop-up window). The second content can also be a pointer to another content, which can be retrieved from another place, or be generated automatically depending of the profile of the target (for example the web browser) according to content creation rules (themselves retrieved from remote servers or stored locally on the target), etc.

Until the execution is not complete (step 340), the second key is not released. The program continues to execute. When the program has finished executing, the second key associated with the first clickable content (or the address of the target/ desired or destination content) is released (step 350), for example by the web server. This release corresponds to the fact that the second key is not hidden in the set of instructions anymore. For example, it can be de-obfuscated or decyphered or decrypted or be the result of a calculation. In some embodiments, this "release" is intended to be understood as an "availability" or an "accessibility". At some point, the key was not released by the program. At another point, it is released and further used or exploited. "Released" means "available" or "accessible" or "liberated" or "set free" or "issued" or "announced" or "attainable". Subtle differences of these words are intended to be covered by the scope of the invention. For example, alternatively, saying that the key is "attainable" conveys the meaning that a simple access is not possible. It is even not possible to try to analyze the key because it cannot be retrieved. Saying that the key is announced conveys the meaning that the existence of the key is revealed but nothing is said about its substance. Alternatively to step 340, the second key may be released during the execution of the executable asset program. In an embodiment, the release of the key occurs upon the termination of the execution of the executable asset program (step 350). According to other embodiments, the release may intervene after essential parts of the predefined asset content have been displayed (the display may then not be considered to be fully terminated). Yet according to other embodiments, the release of the second key may occur before the predefined asset content is displayed (this corresponds to cases wherein there is trust or confidence that the predefined asset content will be displayed and viewed the user). For this reason the proposed method can be disallowed to hasten response time and further retrieval of destination content.

At step 360, there is granted an access to the destination content. In other words, the second key being released, it is received somewhere in the architecture (for example by the web browser or the proxy server which is then the only entity to know the correspondence between contents), and, using this key, the destination or firstly desired content is requested (for example by the web browser to the web server). It is observed that the second key may also be used by the program to decypher the address of the target or destination content (or the content itself) or even used to retrieved from yet another component or server or proxy the desired first content (target). When provided with such a condition, access is granted to the destination (or third) content (by the web server to the web browser) thanks to the second key. The third (or destination) content is tied with the first (clickable) content in this case. The third content can be substantially equal to the first content, it can be a slightly modified version, it can be a replacement of the content, it can be an snapshot or image of the content, or it can be a content of a different nature, The destination content is then retrieved (from a proxy server or another web server by the web server) and finally displayed (in the web browser) on the user interface at a further step (not shown on FIG. 3). The different steps described above (310 to 380) have replaced the standard process 381 (for example, a web browser requesting a destination content, receiving the content and displaying the content).

Other embodiments are now discussed.

A first approach is to directly and simply embed the content link or (target) URL or destination content address of the clickable content in the code of the program. Upon termination of the execution of the program (or during its execution), the target URL would then be accessed, retrieved and displayed, directly by the program. This approach is now discussed. First, the destination address may still be intercepted. Second, an executable program is necessarily required to be loaded in the computer memory before execution. As a consequence, it would be theoretically possible (but difficult) to analyze the code or the set of instructions in the computer memory and to find out the target URL or the key or the address or the identity of the destination content embedded in the program code. An obfuscation mechanism may be used. It would then render the interception more difficult. It is rather recommended to use the additional exchanges of keys. Adblockers may then be unable to skip the execution of the program and they would then be impeded to access directly the target URL or the destination content. As a result, adblockers would fail.

The proposed approach is indeed dynamic (using dynamic correspondences), using proxies or server as shields in combination with programs using keys. Advertisements are provided in an implicit manner using a program such as a Java applet (or any other kind or program). The target URL is accessed only after (or during) the execution of the java applet. The target URL is indirectly revealed in a dynamic exchange of information (here with keys, but it could be any kind of objects, possibly more complex). The proposed disclosure thus features a method and system wherein the key or pointer corresponding to the advertisements/target URL is dynamic.

Some alternatives about the program are now discussed.

The program may optionally be executed in a virtual machine within the mark-up file viewer or browser. Alternatively, the program may be a standalone program whose execution visually hides the first clickable content. The standalone program thus runs concurrently or next to the mark-up file viewer (the browser is a program too). Such an autonomous program is linked to events occurring in the browser. According to other embodiments, the so-called program is alternatively composed of a plurality of interacting programs, for example a first one controlling the display of the second content and a second one controlling the release of the key. In an embodiment, the program is an executable (integrated or not with browser, i.e., a Java applet in an embodiment or a standalone program). According to other embodiments, the program is a set of instructions, which are intended to be interpreted and executed on the local machine. The program can take the form of an executable binary for its execution and would then, according to some operating systems, possibly require a confirmation or authorization by the user. In some other cases, escalating privileges would be possible. In an embodiment, Java applets, provided with the vast majority of web browsers, are used.

Some alternatives about the predefined asset content (or second content) are now discussed.

The predefined asset content (or second content) can be any content. Embodiments of the invention are limitless. The predefined asset content (or second content) can be an image (like an intrusive pop-up). The duration of the display of the predefined asset content (or second content) can range from a few milliseconds (subliminal ad) to a very long time. It also can be a video (from a short film such as a trailer to an entire movie). It can be a flash object.

The predefined asset content (or second content) can be a "snapshot" of the first content, the snapshot containing the advertisement. This way, using a program, advertisers can be certain that adblockers programs have not altered the page. Running a program inside another program serves as an advantage compared to alternatives which use (for example) the conversion of content into an image to leverage the limitations of adblocker programs in terms of OCR or image recognition (these programs cannot recognize and following cannot modify content by removing unwanted parts). The use of the "program inside or aside the program" is not solely involved. The dynamic linking with the presentation of results or the selective rearrangement of content or the management of the conditional access to content correspond to other embodiments of the invention.

Since adblockers cannot get access to the content displayed by the (executable asset) program, they cannot modify the considered content (handled within and from the program execution itself). To provide seamless integration and better ease of use, java applets can use cookies to detect recurrent users, determine or benefit from user profiling mechanisms.

Figure 4:
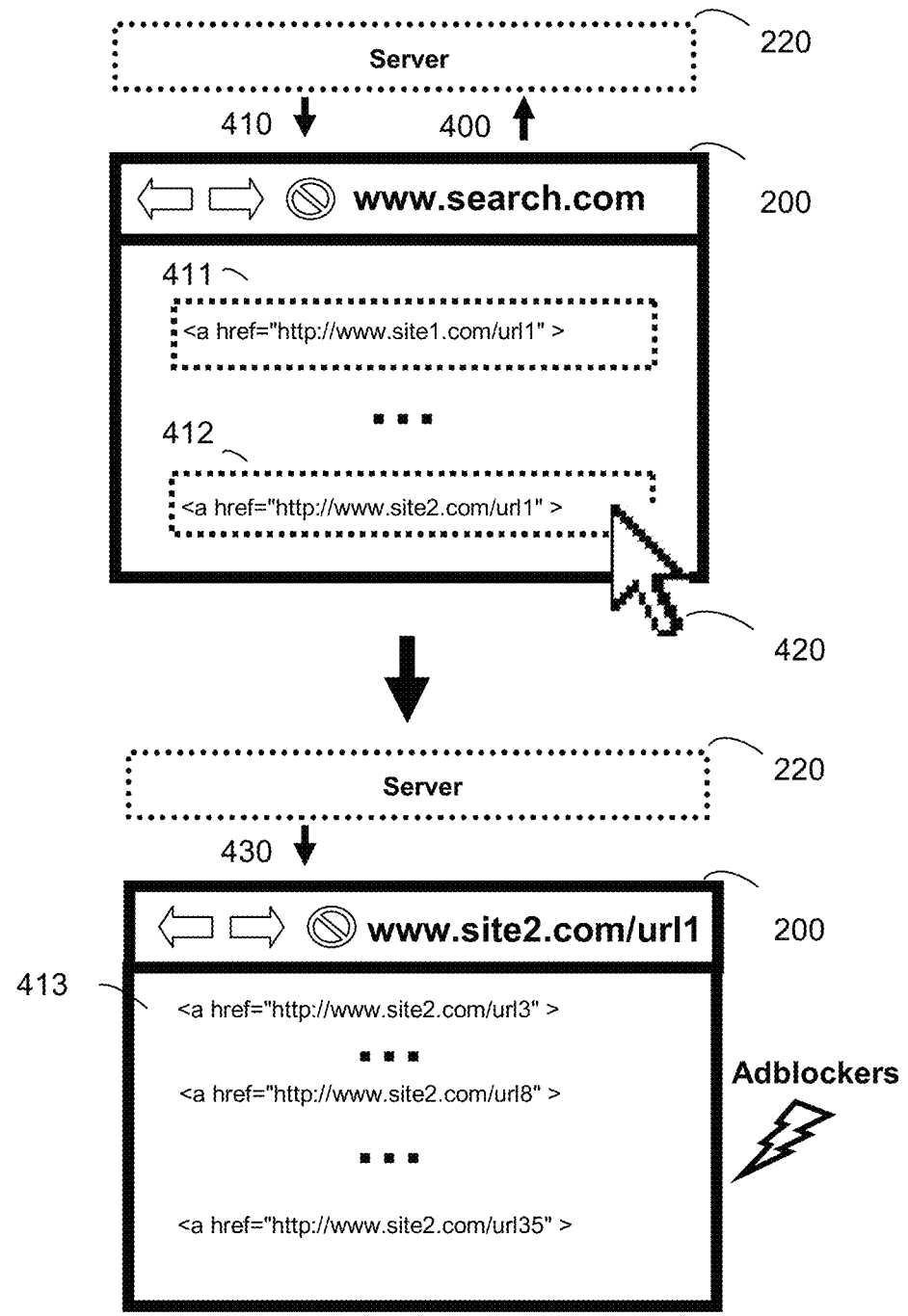
FIG. 4 shows the prior art in a mark-up file environment.

FIG. 4 shows the prior art in a mark-up file environment.

FIG. 4 shows the prior art in a web page, for example results in a search engine web page (or any mark-up file comprising one or a plurality of links).

At step 400 a web browser 200 sends a request to a web server 220. The server responds by returning a list of results, a list of URLs (URLs for Uniform Resource Locator are links to contents or in other words logical addresses of content). The considered page of results comprises a first content link 411 and another content link 412. At step 420, upon a click of the user on the content link 412, the web server 220 responds at step 430 by returning a web page containing or comprising a set of different content links 413.

At each step, adblockers may enter in action. Some content links indeed comprise information indicating a correspondence with known adservers (servers dedicated to the delivery of advertisements). Adblockers usually include these links in blacklists and filter out (remove) such content links. Some other links correspond to text, to images to multimedia objects (flash, etc.). Some links correspond to other links, and so on (principle of hypertext mark-up files). For example and in particular Google Adwords™ appear as filterable elements. Some other links show an indirect relationship with advertisements (use of certain keywords) and get filtered out too.

Figure 5:
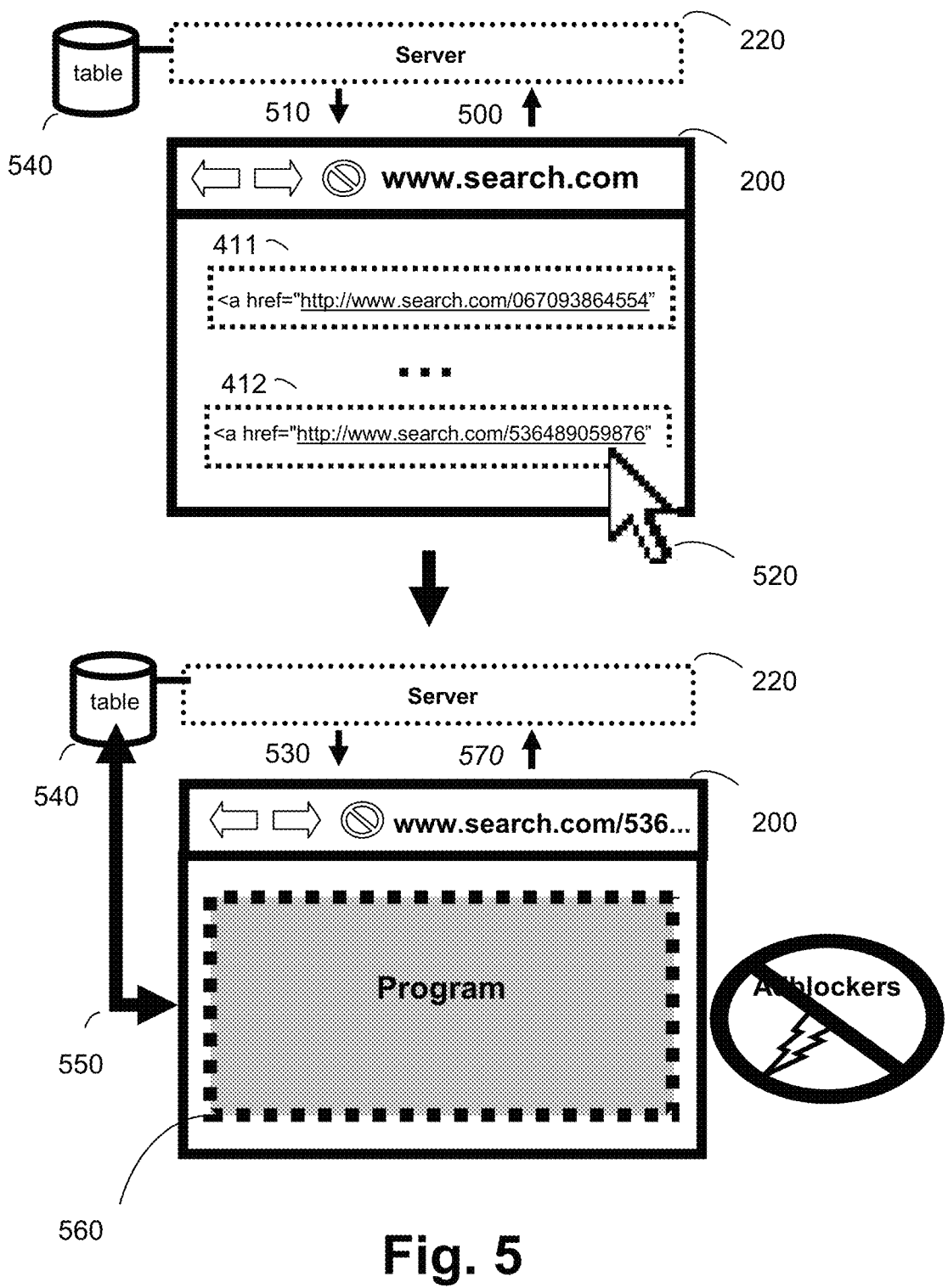
FIG. 5 shows a first embodiment in a search engine web page environment.

FIG. 5 shows a first embodiment in a search engine web page environment.

An embodiment of the invention in this particular search engine environment is now proposed. FIG. 5 still comprises a browser 200 and a server 220. It is supposed for exemplary purposes of the technical effect of the implementation of the invention, that the browser is provided with a locally implemented adblocker program(s) (such as browser extensions or add-ons or plug-ins).

According to an embodiment of the invention, any explicit reference to content is removed. Instead of explicitly providing the links to the content the user is looking for (the "target URLs" or destination content real, effective addresses) like: <a href="http://www.site1.com/url1"> or <a href="http://www.site2.com/url2">

The content links are modified, in order to only include reference to the desired contents in the form of a unique (first) key (please see further explanations about the mode of generation of keys), the correspondence of which is only known by the server (or proxy), thanks to a correspondence table (explained and detailed in FIG. 6). For example the following links will be presented by the server 220 on the web page (here search results page) to the web browser 200:

<a href="http://www.search.com/067093864554" >
<a href="http://www.search.com/536489059876" > (not shown)

In HTML, the content link syntax is the following: <a href="url">Link text</a>. The start tag contains attributes about the link. The element content (Link text) defines the part to be displayed. The element content is not limited to a text, it may be a link of/from an image or any other HTML element. It is thus observed that according to the first step of the present embodiment, the URL or content link has been modified, but the "link text" remains unchanged. In an embodiment, the "link text" may also be converted into an image to defeat adblockers which are not provided with OCR capabilities (further development to defeat adblockers). Alternatively, the "link text" is modified to remove any reference to the initial nature of the desired content (but the key enabling the association with the first desired content is to be available).

The web server 220 responds to a request of the web browser by providing a (modified) web page comprising (modified) content links. For example, the page of results comprises a first content link 411 and another content link 412. In the example the key is the string of characters "536489059876". As a result of this first step, the target URLs are now unknown by the browser and in the end by the adblocker, since target URLs do not contain any hints about the nature of the content.

In other words, there is delivered or presented a starting web page, a starting content. This starting content comprises clickable content: clickable texts, clickable images or parts of videos, etc.

At step 520, upon a click of the user on the content link (or clickable content) 412 an HTTP request in sent to the web server containing the key (in the example "536489059876"). Upon reception of the request, the web server 220 looks up in the table and responds at step 530 by returning a web page containing or comprising a program 560 which includes the key (in the example "536489059876").

The executable asset program 560 is of the type described in FIG. 3. It is determined or generated and associated with the (second) key. It comprises or is able to release the (second) key (in the example "536489059876") once the execution is terminated or during the execution of the program. The execution of the executable asset program renders a second content (or predefined asset content) on the user screen, on the user interface. When the program has finished executing (in a certain embodiment), the key associated with the first (clickable) content is released (in the example "536489059876"). The second key is received (for example by the browser) and, using the key, the destination content is requested (for example to the server at step 570); access to the destination content is granted (the server 220 establishes the correspondence at step 550; in the example "536489059876"). In the end, the destination content is retrieved and displayed in the web browser.

As a result, adblockers are defeated. Content links or clickable content do not comprise indications or hints about the nature of the predefined asset content and, combined with this "formatting" operation or diversion, the desired or destination content is conditionally delivered (provided that the second or predefined asset content has been displayed). The web server retains the knowledge of the correspondence between keys and contents until a precise instant, the instant wherein a determined or predefined content (an advertisement for example) has been displayed. As a result, adblockers cannot use their blacklists and they cannot use either the detection of certain keywords. Since keys are adapted to change all the time, adblockers can not react. They cannot impede the program from executing (unless they have sufficient privileges to impede programs from running within the browser, as Java applets for example. However, it is noted that the user in fact is likely to require or enable the program to run because of his willingness to get the initially desired content.

Other alternative embodiments are now discussed.

The present disclosure applies to a broad range of possibilities. While the first clickable or selectable content is the desired content by the user, the second or predefined asset content may be:

A part of the first clickable or selectable content. In this case, the desired content appears to be fractioned or distributed over a sequence of displayed content. As an example, the beginning of an article can be displayed and a further reading may be granted provided the proposed method is implemented.

Related or not related to the first content. For example, it can consist of an advertisement (in any form, still image, video or 3D animation).

It can also be the identical to the first clickable or selectable content. In this case, the desired content is displayed immediately and the released key serves for other further purposes (such as bonus contents or hidden contents, methods of control, like logs or counts of any nature). The content provider knows that the predefined content has been displayed in a secure environment, i.e., the executable asset program.

The predefined asset content is predetermined according to an embodiment. According to other embodiment, it can not be predetermined. In this case, the expression "predefined asset content" should be replaced by "asset content". The asset content can be calculated, generated on the fly given the user profile or randomly chosen for example.

FIG. 6 shows the correspondence table and other embodiments.

FIGS. 6a to 6d show various embodiments, in particular with respect to the correspondence table. The correspondence tables can comprise one or a plurality of keys.

In an embodiment, keys are alphanumerical (with a combination of letters and figures, in capital or not; for example "dE45gZdF32aAsSAazZ"). It is observed that alternatively keys can be numbers or strings of characters or files (images, 3D models) or (auto-executable) programs or any identifiable object serving as intermediary. User authentication or SSL mechanisms (encryption certificate) can be used. Keys act as pointers, addresses, index. Keys may serve as deciphering/decryption keys (for granting access, for decryption of content, the keys being public keys or semi public or private keys). Keys may act as identifiers.

In a certain embodiment, each key of the table is unique (each digital content corresponds to a unique key), but it may be also be specific to a session or a couple {session/identified requester}. It can also be generic to an identified requester, i.e., all content requested by a given requester will get the same key for convenience purposes Keys also can use profiling mechanisms, temporary storage such as cookies. It is observed that the considered key is unique. In an embodiment, it is randomly generated. A given component somewhere in the architecture (see FIG. 10) memorizes the association between the key and the considered content (i.e., is the only component of the architecture to be able to proceed to such association). It may possible that given the huge number of generated keys some generated keys prove to be identical, depending on the generation mode. In this case, if a collision occurs, another key is generated. Using MD5 or SHA-1, hash functions of the contents, it is possible to greatly reduce such risks of collision. Hash functions present the further advantage of speed. Regular cleaning and refresh of the table of correspondences also permit to eliminate such collisions.

A correspondence table is maintained in the server 220 in the provided example. Alternatively, such a table can be implemented in a server interacting with the server delivering requested contents (not shown). The table can be maintained in a given component of the architecture, which component memorizes the association between the key and the considered content (i.e. is the only component of the architecture to be able to proceed to such association).

The server 220 interacts with a plurality of web browsers over the network. The server 220 is able to discriminate queries and to provide individualized responses. Therefore, it is provided with (hardware or software) means enabling such purposes. Upon receiving HTTP requests from web browsers, the server 220 builds lists of target URLs by associating "keys" with target URLs or content addresses.

FIG. 6a shows the situation wherein a unique column exist in the correspondence table. A unique key (KEY_1), the first key, is associated with the destination content (as explained in FIG. 3).

FIG. 6b shows another embodiment of the invention, wherein two columns of keys are used. In order to reinforce the robustness of the proposed method, a second key and/or time-stamped information is used. The second key acts as a "secondary shield". In this case the second key (in the example "98789755546"), upon reception of the first key (in the example "536489059876") transmitted with the request (along with the clickable or selectable content), will be transmitted to and enclosed in the program (this may further require from the program to request from the web server the correspondence between the second key and the desired or destination content).

On the example of the embodiment of FIG. 6b, two keys are provided. The first one enables a first indirection (first protective screen or shield) while the second one is used to retrieved the desired or destination content.

In the table below, the first key KEY_1 is the reference that is used to build the content link or is associated with the first given clickable content as seen in previous figures. The second key KEY_2 is another key which is generated or determined. KEY_1 and KEY_2 are unique identifiers according to a certain embodiment. That is, the key generation mechanism ensures that when a new record is created in the table, generated keys are not already present in the correspondence table.

| URL | KEY_1 | KEY_2 | Time stamp |
|---|---|---|---|
| http://www.site1.com/url1 | 067093864554 | 09864778308 | 23-10-2009:06:00:29:256 |
| http://www.site2.com/url2 | 536489059876 | 98789755546 | 18-11-2008:06:15:29:544 |

When the user clicks on one of the link of the result page of the example, the following actions happen.

Supposing that the user clicks on a first clickable content (first link) 411 (FIG. 4), the browser sends the first key "067093864554" to the server 220. If the server 220 cannot find the key passed in the request in the correspondence table (column "KEY_1"), then a message is sent back to the web browser (such as "This link is expired, please reload the page"). Please see further explanations for table entry expiration. If the server 220 is able to retrieve the requested KEY_1 in the table, then the server 220 responds by sending back an executable asset program which comprises the following steps (according to one embodiment of the invention):
a) a sequence of code that will display a predefined asset content (an advertisement);
b) a constant value K embedded in the sequence of code for example;
c) a sequence of code that is able to compute the second key KEY_2 based on the K value, wherein the sequence of code is embedded in (intricated into) the code of a);
d) a sequence of code that is able to query and get from the server the actual URL corresponding to the second key KEY_2 (via a request which contains the second key KEY_2 that is sent to the server); the sequence of code being embedded in (intricated into) the code of a);
e) a sequence of code that will finally load the destination content or target URL page (in the web browser).

Several points are now discussed.

The step a) is executed at least to ensure that the second content (ad) is displayed before the target page is loaded. Steps b) and c) will vary for each click (automatically generated by the server based on the second key KEY_2 value). Therefore, no adblocker will be able to identify with certainty the sequence of code. When the step d) is executed, a query containing the second key KEY_2 is sent to the server 220. The server 220 looks up the correspondence table and returns back the URL value (target URL or destination content).

Still optional, a table cleaning mechanism can be implemented. A house keeping function periodically scans the records in the table. The records that have been created earlier than a configurable amount of time are considered as "expired" (for this the timestamp information of the record is used). Expired records are deleted from the table. In yet another embodiment, this timestamp information is dynamically used to discriminate web browser queries (for example, associated with constant values K, etc.). The table cleaning mechanism enables to handle specific relationships between the browser and the proxy. Keys may thus be temporarily coupled. Refresh and expiration mechanisms reinforce the dynamic characteristic of the invention.

Figure 6C:
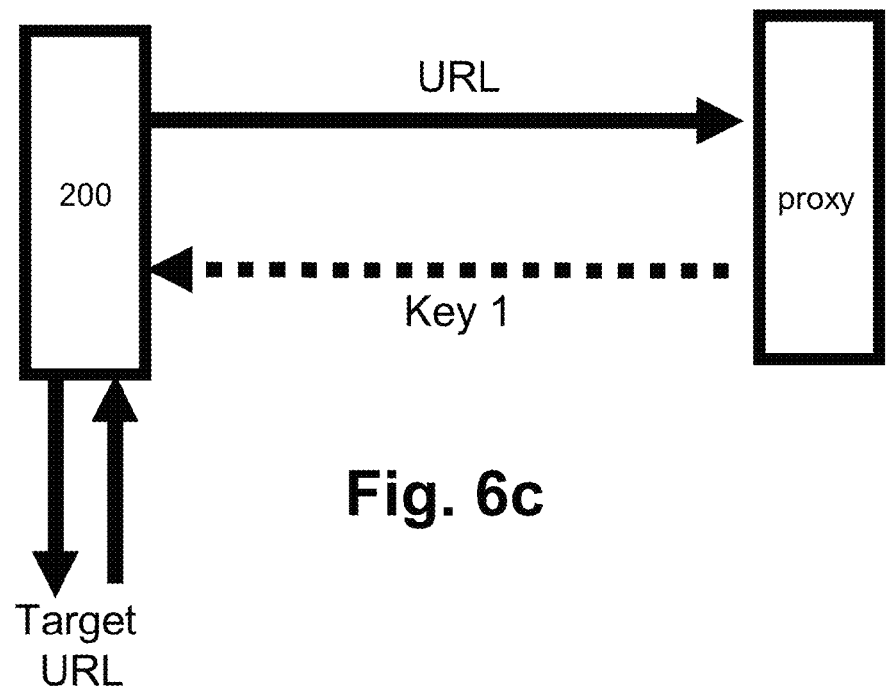
FIG. 6 shows the correspondence table and other embodiments.

FIG. 6c shows a schematic view of simple information exchanges according to one embodiment of the invention, wherein one key is used. Upon a click of the user on a link or a clickable content or element of a webpage ("URL"), a proxy 220 identifies the pre-existing association of the URL with a Key (Key 1). The first Key 1 is returned to the web browser 200. The key is used by an executable asset program running on the browser 200 which computes another value (for example the address of desired content, the target URL) thanks to the first key. The result is expected by the proxy or the server. Upon receiving the correct value, access to the destination content is granted and it causes the browser to retrieve the "target URL" (from another proxy or server, not shown) or to display the destination content.

Figure 6D:
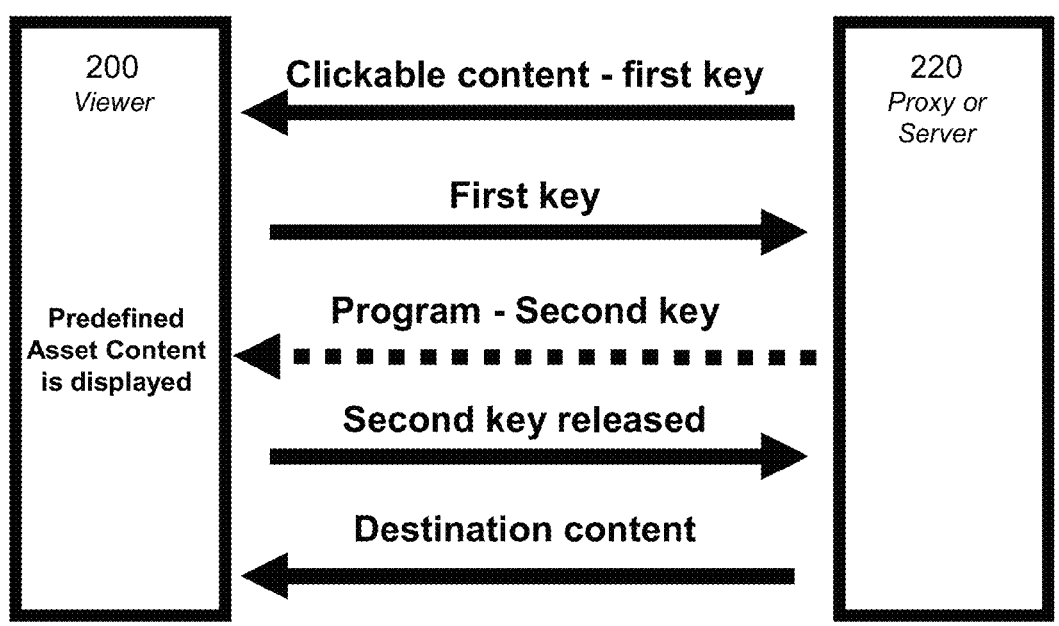

FIG. 6d shows a schematic view of information exchanges, wherein two keys are used. Upon a click of the user on a clickable content (or link) of a starting content (modified webpage) in a web browser 200, a proxy or server 220 extracts or retrieves or deduces or computes a first Key 1 contained in or associated with the clicked content (or URL) and identifies the pre-existing association of the URL with a second Key (Key 2). The Key 2 is returned to the web browser 200 in a specific manner. The Key 2 is hidden in (or generated by) an executable asset program running and executing on the browser 200. The execution of the program causing a particular advertisement or predefined content to be displayed. The execution also produces the effect of revealing Key 2 to the web browser 200, which transmits this information to the proxy 220. The proxy is responsive to the Key 2 and communicates the destination content address or the "target URL" to the browser 200 which in turn retrieves the destination content or the web page associated with the target URL from web content servers (or the proxy can directly serve the desired content).

FIG. 7 shows other embodiments related to the execution of the program.

Figure 7A:
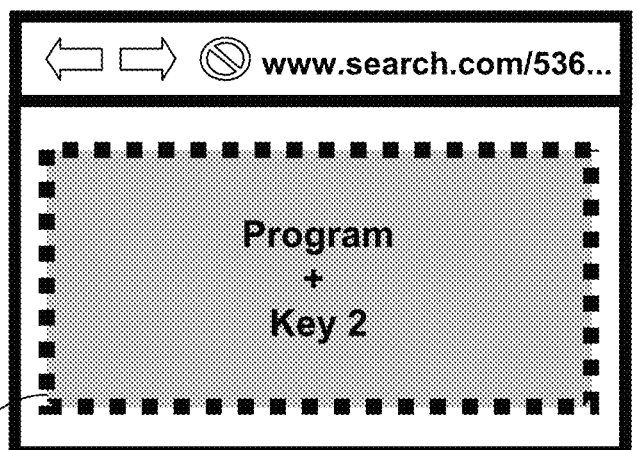
FIG. 7 shows other embodiments related to the execution of the program.

In an embodiment, the program 560 renders an entire webpage (destination content), as shown on FIG. 7a. This embodiment corresponds to a complete control of the display to the user. The first and the second content can be freely adapted. The predefined asset content can be a full-screen video, a full-screen image, etc. It can also be a combination of an advertisement with portions of the destination content.

Figure 7B:

Alternatively, more complex situations can occur. As shown on FIG. 7b, the program renders only in a subpart of the page (of the user interface). In FIG. 7b, it is illustrated that upon a click on a clickable content of the starting content (or content link) the program 560 executes while leaving unchanged other parts of the page (such as content links 700 and 710). Parts of the page or screen are thus rearranged (if the surface area required for the display of the program is larger than the surface occupied by the content link being clicked).

Figure 8:
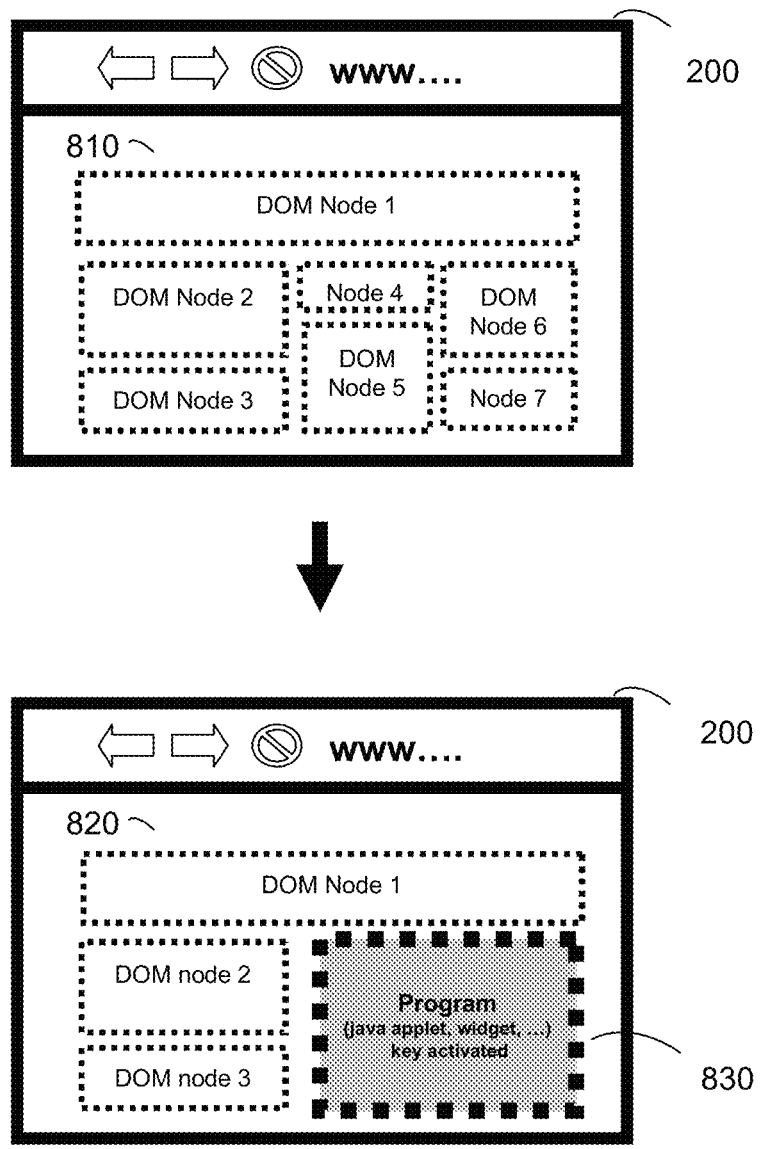
FIG. 8 illustrates operations on the DOM tree according to some other embodiments.

FIG. 8 illustrates operations on the DOM tree according to some other embodiments.

FIG. 8 shows another example of an embodiment of the invention, by highlighting the DOM structure of the mark-up file or of the digital content. The "DOM" expression is to be understood as a way to refer to a (or the) logical structure of a digital document. The expression can thus be replaced by expressions such as "logical structure" or "hierarchical structure" or "structure". The so-called DOM (Document Object Model) is a way to refer to elements (such as XML or HTML) as objects. It is a platform-independent and language-independent standard object model for representing HTML or XML and related formats. The logical structure of the document is thus defined thanks to the so-called DOM tree. The parts of the DOM tree are known as nodes. To get the DOM tree of a markup file, a markup file parser is required. Indeed, a parser loads the document into the computer's memory. Once the document is loaded, data of the document can be manipulated using the DOM, which treats the XML document as a tree. A DOM tree comprises a plurality of (parent and child) nodes. There are some differences between Microsoft's XML parser (COM component) and the XML parser used in Mozilla browsers, but the described method and system apply to all browsers and parsers.

FIG. 8 shows a set 810 of DOM nodes displayed in a browser 200. Child nodes 1 to 7 are shown. In the particular example shown in FIG. 8, implementing the method, the program 830 replaces a subset of child nodes (nodes 4 to 7), resulting in a second set 820 of DOM nodes: nodes 1 to 3 are still visible, while nodes 4 to 7 have become hidden by the program's display. According to some embodiments, the program can indeed render a display area which can replace (in the mark-up file code) or hide (in front of the browser) any subset of DOM nodes of a given web page or digital content.

The rendered area can even be partially transparent (leaving visually unchanged some background elements, while others are recovered and appear visually modified). The advantage of such a selective modification or masking of the page is that it becomes possible to get a reengineering of the original page, by modifying the originally programmed interactions of the page. For example, some parts of the page can see their interactions leaved unchanged, while other parts will see their contents modified and secured by application of the proposed method. The display controlled by the program can also cover disjoined areas, hiding or masking or modifying for example nodes 2 to 3 in addition to nodes 6 to 7 on FIG. 8. To the extreme, the execution of the program can be rendered transparent for the user.

In an embodiment, the program runs "within" the browser (like a Java applet), i.e., confined in a delimited area of the window of the browser. According to other embodiments, the program is a standalone or autonomous program running in "background" and coupled with the browser. It intercepts and interprets browser's events (through APIs, or by scrapping). Acting as a "parasite program", it modifies the visual aspect of the display of the window of the browser by operations such as masking, hiding or modifying display elements (or a combination).

When executing, the surface of the window used by the program can range from one pixel square to the entire surface of the desktop window (or the full angle of vision of the user, if other display techniques are used). This variable surface of the considered display enables multiple possibilities. In particular, a single picture in a content link or a very small surface can act like a "trap": once clicked, the launch of the program enables a full reengineering of the rendering of the page, since a standalone program does not have the limitations of a Java applet (a Java applet is confined to a precise area, though an independent or autonomous program can use all of the possibilities of rendering of the screen).

Details about possible adblockers' attacks are now discussed.

Adblockers are very unlikely to use man-in-the-middle attacks unless there are very advanced programs. Possible attacks would or could consist in running a plurality of browser instances (at least two), one of which being hidden to the user and adblockers "switching" between displayed elements of the two instances (the display of the second content would remain hidden, while the display of the first content would be granted a display). Adblockers of the future are thought to be able to detect the start and the end of the execution of the program, and following to intercept the key. But nothing more. Adblockers are not able to spy on the server side, to establish and discover the (required) content correspondences. The use of image recognition also seems very unlikely to happen (capturing the rendering of the program and converting it into modifiable contents). Adlockers indeed would in this case require very advanced features in order to defeat the proposed method. This is thought to be very difficult, because—at least for now—image recognition technologies perform quite poorly (screen resolutions are not sufficient to derive usable data) and are very CPU intensive. In the foreseeable future, such attacks may still occur. It is believed that approaches consisting in listening HTTP requests and trying to reverse re-engineer the table also do not seem feasible or efficient (if the key generation is random, this is impossible) Adblockers also could try to emulate the program or to "encapsulate" the program, i.e., run the program in a sandbox (virtual machine) in order to retrieve the key required to get the target URL address. In other words, adblockers can try to respond to the proposed method by applying the same kind of countermeasures precisely implemented to defeat them. Since web browsers do not allow such deep modifications (and related privileges), this approach is believed to be condemned in advance.

Figure 9:
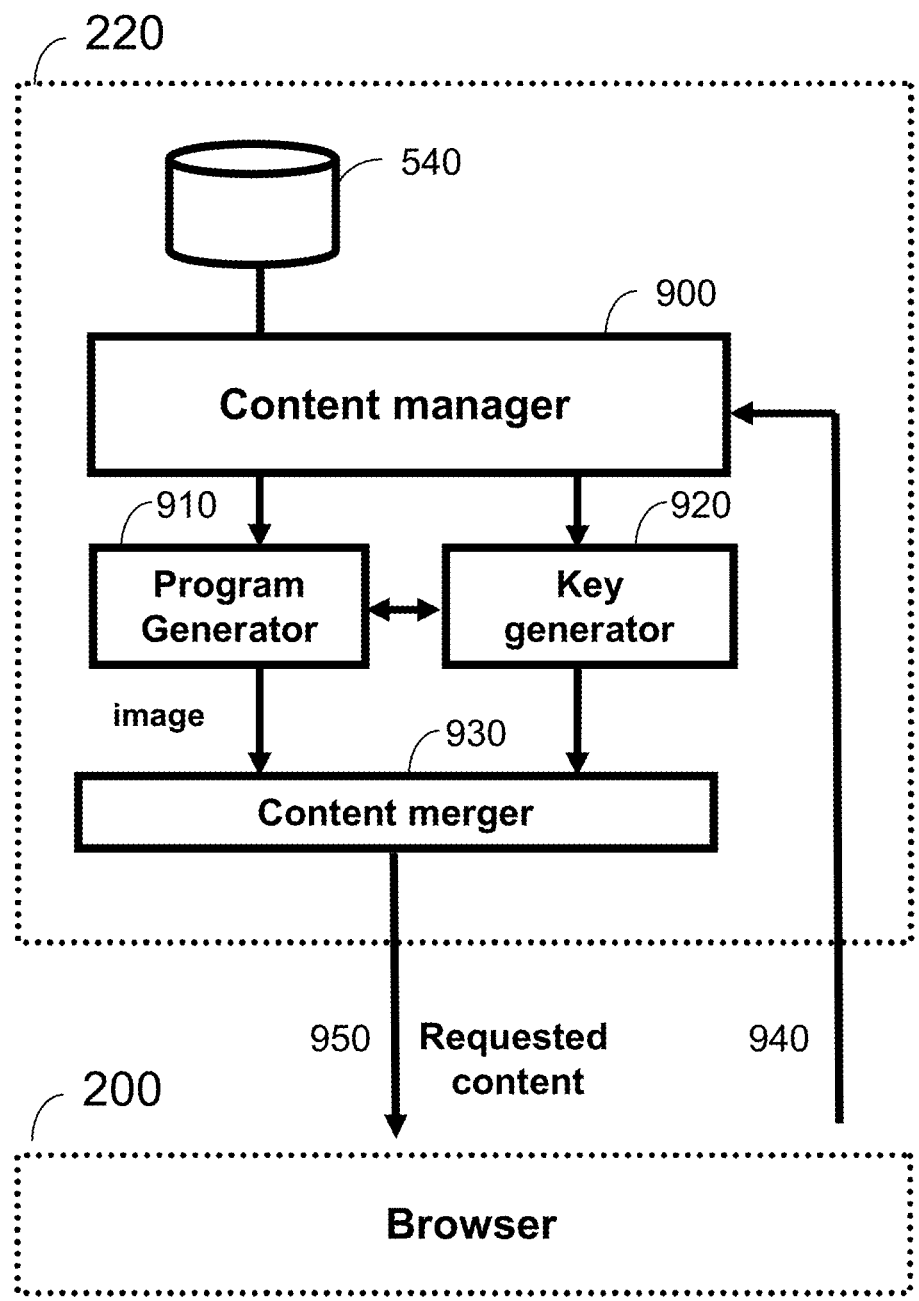
FIG. 9 shows a block diagram illustrating the system view.

FIG. 9 shows a block diagram illustrating the system view.

FIG. 9 shows a web browser 200 and a proxy 220. As components implemented in the proxy server, FIG. 9 shows a database 540, a content manager 900, a program generator 910, a key generator 920, and a content merger 930. The proxy 220 interacts with the browser 200. At step 940 the browser emits a request for a first given clickable content (or a first content) presented on a starting content page, to the proxy 220 which responds by transmitting at step 950 a modified requested content (comprising a program). The content manager 900 receives the request for the first content. It queries the database 540. The content manager 900 interacts and controls the program generator 910 (or manager) and the key generator 920. For example, the content manager 900 is adapted to split the first requested content into several areas (overlapping or not the underlying DOM structure), which areas are handled or not by the program generator 910, which converts and embeds parts of the content into a program. The program generator 910 interacts with the key generator 920 which computes second keys. Each second key is associated with each program generated by the program generator 910. A program may be, but is not limited to, a Java applet for example. At step 930, the content merger 930 generates a modified content from the first requested content and transmits the modified requested content to the browser 200. For example, in the context of mark-up languages, if the first requested content is an HTML page, the content manager 900 generates an HTML page comprising a combination of one or a plurality of Java applets or programs or set of instructions and unchanged parts of the initial HTML web page having being requested.

According to certain embodiments, a mark-up file is delivered or served by the web server 220 and is received and interpreted by the content manager 900, i.e. it interprets the mark-up file in an embedded viewer or browser. After parsing it, the content manager 900 constructs the DOM tree of the mark-up file. The content manager 900 is adapted to manipulate and/or modify the DOM tree (by operations such as deletion of node(s), replacement of node(s), etc). The content manager 900 interacts with the program generator 910 (which is suitable for computing one or a plurality of programs rendering one or a plurality of DOM nodes) and the key generator 920 (which is suitable for computing one or a plurality of keys). In other words, the content manager 900 interacts with the program generator 910 which determines or generates executable asset programs. According to certain embodiments, the content merger 930 then builds a modified mark-up file from the generated program, the generated key and unchanged parts of the original mark-up file. The modified mark-up file is then received and parsed and interpreted by the web browser 200. The mark-up file comprises the predefined asset content. Finally, the browser 200 queries the web server 220 again and the process continues accordingly for interactively browsing the Internet.

It is observed that each of the above described operations can occur at a different level of the architecture. The substitution/masking/replacement of links can be performed in various ways (by proxying, on the fly or at an early moment or from the origin, etc.). The content manager can execute at server level (FIG. 9 as shown) or at the browser level (not shown) or at a proxy level (not shown). In particular, once the user is trapped in a proxy (a click on one link enables a given proxy to translate all addresses), it is not possible to "escape" unless quitting completely the connection with the proxy.

It is further observed that the generated program can be further adapted to cause a user terminal upon which it is executed to transmit extracted information of the terminal continuously (for prefetching purposes, i.e., anticipate the request of mark-up files referred to in links present in the mark-up file to accelerate response time) or on a periodic basis (via refresh mechanisms).

It is observed that the predefined asset content can be inserted at different levels (program generator 910 or content manager 900 or even content merger 930). The generated program can convert content into images and control their display. As per the generation of images, there can be implemented a type of mirroring according to another embodiment. Such a mirroring enables further possibilities. In the case where the mark-up file is an HTTP mark-up file, when an HTML request is performed, information about the browser itself is transmitted (type, colours, resolution, etc.). Usually, this sort of fingerprint is transmitted once, but this information can be retrieved on a regular basis. With (Java)script code, it is thus possible to analyse the resolution of the page and to accordingly render the image files (by resizing the image(s)). According to certain embodiments, the images generated by an embodiment of the invention can be of the same size than those of the displayable elements of the original mark-up file. But according to other embodiments, they also can be larger or smaller, depending of the display area of targeted viewer or browser. In the case where image files are larger than the display area of the targeted viewer or browser, the targeted viewer or browser will use standard scrolling options to display the complete image of the original mark-up file. A reengineering of original web pages through generated programs displaying corrected images becomes possible. According to other embodiments, the use of cookies can be valuable to store information gathered on the user and/or the web browser (type, colours, resolution, etc.), setup auto-refresh mechanisms, etc.

FIG. 10 discusses architecture options.

The architecture comprises three entities: the web browser or viewer, the proxy and the web server. This architecture offers many interesting opportunities and leads to different embodiments of the invention, which are now discussed.

FIG. 10 shows a web server 200, a proxy server 1000 and a web browser 220, in various configurations. Logically, the proxy server 210 is located between the web server 200 and the web browser 220. Physically, the proxy server 1000 and the web browser 200 can be running on the same physical machine as shown for example on FIG. 10a. However, using a virtual machine on the local machine running the web browser 220 itself is not always possible and FIG. 10b shows a situation wherein the proxy server 1000 and the web server 200 run on the same physical machine. FIG. 10c shows the last situation wherein the web server 200, the proxy server 1000 and the web browser 220 run on three different physical machines.

Since a proxy is usually hardware-implemented, it can also be software-implemented. Consequently, steps of an embodiment of the invention can be implemented partly in the web browser 220, partly in the proxy server 1000, partly in the web server 200 (or a combination).

According to certain embodiments, since the proxy server will see all queries of the web server (account numbers, passwords and visited pages of the web browser will be transmitted to the proxy server through the web browser queries), it is highly recommended that the proxy be run by a trusted party (unless OpenID or other anonymization mechanisms are used). Authentication mechanisms may be used (ranging from a strong authentication to a simple registration; hash values may be used for the delivery of image files).

FIG. 10a is anticipated to be a simple and easy implementation, because of agreements between administrators of the web server (content provider) and advertisers. In an embodiment, the web browser has nothing to tell about this mode of implementation (operations performed will be transparent, i.e., the browser will request contents as usual and the web server or the proxy will implement steps of the method; queries will be easily intercepted by the proxy server). One advantage of such configuration is that the web browser does not need to be modified while the content provider/web server/proxy server has the guarantee to secure its advertisements. It is a win-win operation that opens many interesting business opportunities.

FIG. 10b illustrates a further possibility, according to a certain embodiment. Embodiments of the invention can be implemented locally on the web browser, in a superior level of privileges than the web browser (operating system for example). This is the standalone version of the (executable asset) program.

Alternatively, the executable asset program according to invention can be implemented in the form of a plug-in or an add-on. The execution or presence of such a program may even be required by the web server for example (non compliant browsers wouldn't be served for example). The browser may agree to the presence of described steps, or not. For example, the presence and execution of such a program (trough a marketed "ad secure" browser add-on) may be required by the advertiser in order to allow the delivery of web pages (in this case, the user of the browser may agree to the installation of such an add-on for example). Embodiments of the invention can also be implemented in a proprietary browser (over which the user has little if no control).

FIG. 10c illustrates more complex cases, since the proxy server may act as a malware for example (man-in-the middle attack, for securing the display of advertisements, eventually against the willingness of the browser, or without its consent). According to certain embodiments, an implementation as a malware application is indeed possible; the malware application executes the steps of the method without the consent of the user of the browser. A malware would for example intercept queries, proxify links and force to use the generated and hardened program according to embodiments of the invention, whose execution results in the display of the desired advertisements. According to other embodiments, a possible mutualisation of proxy servers occurs through the network. The proxy also may act as an on-demand resource for the web server.

Further observations can be formulated about the proposed two-tier architecture. The modified content links can (in some situations) exclusively contain addresses of content servers (delivering destination contents) such as URLs of external web servers, i.e., which do not implement the described method; in this case, the web browser will query directly these content servers. This is an open system. For example, a scenario of such a use of the described method corresponds to a one-shot way, "on-demand", to secure the display of a web page. But the modified mark-up file also can exclusively comprise addresses of proxies implementing the described method and in this case, the proxies would be further adapted with address-translators for retrieving requested content. This is a closed system, forcing the web browser to query only proxies implementing the described system. Once a web browser has queried such a proxy, it is trapped and will only see reengineered contents (by the present method or others). A last possibility is to have the modified mark-up file containing both addresses of content servers (for direct queries) and proxies (for indirect queries). The three possibilities described above depend on a policy to be determined (policy to decide whether the described system is closed or opened, or at what point it is partially opened or closed).

Further embodiments and further aspects and advantages of the invention are now discussed.

The program can run one or a plurality of windows. In an embodiment, the program executes and renders one unique window. It is also possible that the program execution requires the launch of several windows, some of these windows taking control of the z buffer.

For example the program 830 of FIG. 8 can render a unique window which may recover all nodes or a selection of nodes. The windows being generated can even recover disjoined areas. For example, the program can hide simultaneously nodes 6 and 7.

In addition, an additional prompt to the user may be required, asking for the name of the brand in the last ad displayed, thus making sure that the user does have seen the ad. Alternatively, the user may be presented a challenge, such as a kaptcha challenge, in order for the key (first and only, or second, or else) to be released (if the response to the challenge is correct, the key is released for further decyphering/retrieving of the desired content. Otherwise, the access to the content is not granted).

Some embodiments of the invention ensure that the program has to be executed in order to get the information about the target URL. The exact query to be sent to the server to get the target URL or destination content is not explicit in the code of the program but may be embedded into it. It may be never composed of the same data and set of instructions so that it cannot be identified and blocked (even approaches by signatures are likely to fail). If the browser gives control to the program, the program is able to display predetermined contents before loading the target URL requested by the browser. If the browser does not give control to the program, the target URL will not be retrieved.

The information related to the target URL or the destination content is not present in the code of the program. It is retrieved at the latest moment and possibly by all secure means (optionally requiring authentication, or exchange of keys), avoiding adblockers trying to emulate the program whose execution is forced.

According to some embodiments of the invention, a search engine provider inserts advertisements following the proposed method when a user clicks on one of the content link of the result page or starting content page (while these content links are accessible by other means and without any advertisements). In this case, the search engine provider does not control necessarily the final or destination contents (target URLs). To the contrary and according to another embodiment, a publishing company, fully controlling its content, forces the execution of the program rendering ads or other content. In this case, there are no copies of the content elsewhere on the network. It is also observed that rendering content thanks to a program may also enable a control of copies (since only snapshots and no copy/paste of texts may be allowed). Rendering content this way also avoids traces of any divulgation (since contents are only displayed temporarily and no storage of data is occurring, other than snapshot images which are insufficient for OCR conversions). In today's paradigms, contents are separated from rendering programs. In some aspects, some embodiments of the invention avoid this teach away and tend to couple contents with programs.

According to other embodiments of the invention, the method defines additional mis-directions for adblockers. The code of the program does not contain any explicit reference to the target or destination content, but only a key (which in addition is only temporary, i.e. which expires after a certain delay). This key can optionally be hidden in the code (obfuscation techniques). The key can also be variable, thus generating each time different programs.

The present disclosure shows a two-tier architecture, wherein the proxy server performs steps of particular embodiments of the invention (DOM tree modification and program generation). However, the implementation of the proposed mechanisms can be made according to many more possibilities that will be further discussed.

Some considerations about proxies and the economy of browsers are herewith provided. Browsers can be broadly understood as "viewers". A browser is designed to render mark-up files into displayable elements for the user and to execute code elements. Indeed, web browsers are software programs installed on desktop computers or mobile devices and adapted to execute script programs (mostly JavaScript), parse and display web pages. From technical and legal points of view, some web browsers are open source and others are proprietary (Internet). This distinction between open source and proprietary is important, because proprietary software enables to control software code developments, which is not the case with open source software. For example, proprietary media players can forbid fast-forward, thus forcing users to watch video advertisements (in general located at the beginning of video files). With open source software (i.e., accessible and modifiable software code), this is not possible anymore, since software code can be changed to enable advertisement skipping. More generally, this is true for any DRM (Digital Management Right) system, which necessarily requires at least a portion of closed software code (protection by secret as opposed to open source code which is available to anyone). In theory, proprietary browsers would be capable of selectively enabling advertisement blocking (no specific add-on available, etc.). The case of open source web browsers is more simple, since forks can emerge anytime, allowing such specific add-ons. Another important aspect of advertising blocking economy is business interests. A well known open source browser is largely funded by a major advertising company (and thus has little incentive and interest in enabling a default integration of ad blockers in its browser). However, forks (modified distributions of the open source browser) could emerge anytime. Proprietary web browsers could possibly selectively enable some advertisements and disable others, according to their own interests or agreements. For example, it might be technically possible for a browser to block Google Adwords™ and to allow only those of its own platform. For all these reasons, the use of a proxy server performing steps of an embodiment of the invention is very valuable (but not mandatory).

According to certain embodiments, Java applets or widgets are used. Therefore, some definitions and explanations are provided below.

Java: Java is a de facto standard. End-users commonly use a Java Runtime Environment (JRE) installed on their own machine for standalone Java applications, or in a Web browser for Java applets.

Java applet: an applet is a software component that runs in the context of another program. Java applets are programs that are embedded in other applications, typically in a Web page displayed in a Web browser. Most of web browsers available on the market today incorporate the ability to run secure Java applets within web pages. A Java applet is an applet delivered to the users in the form of Java bytecode. Java applets can run in a Web browser using a Java Virtual Machine (JVM). In an embodiment, such applets are used in the method of handling contents. An applet is placed in an HTML document using the <applet> HTML element. The applet tag has three attributes set: code="X" specifies the name of the JApplet class and width=" . . . " height=" . . . " sets the pixel width and height of the applet. Applets may also be embedded in HTML using either the object or embed element. The host application, typically a Web browser, instantiates the "X" applet and creates an AppletContext for the applet. Once the applet has initialized itself, it is added to the AWT display hierarchy. The paint method is called by the AWT event dispatching thread whenever the display needs the applet to draw itself. An applet is distinguished from "subroutine" by several features. First, it executes only on the "client" platform environment of a system, as contrasted from "servlet". As such, an applet provides functionality or performance beyond the default capabilities of its container (the browser). Also, in contrast with a subroutine, certain capabilities are restricted by the container. An applet is written in a language that is different from the scripting or HTML language which invokes it. This other language adds another difficulty for adblockers. The applet is written in a compiled language, while the scripting language of the container is an interpreted language, hence the greater performance or functionality of the applet. Unlike a "subroutine", a complete web component can be implemented as an applet. Unlike a program, an applet cannot run independently. An applet features display and graphics and often interacts with the human user. Most of the time they have restricted security privileges. Java applets are indeed executed in a sandbox by most web browsers, preventing them from accessing local data. The code of the applet is downloaded from a web server and the browser either embeds the applet into a web page or opens a new window showing the applet's user interface. A virtual machine architecture allows very fine-grained control over the actions that code within the machine is permitted to take. This is designed to allow safe execution of untrusted code from remote sources, a model used by Java applets. Applets run within a VM incorporated into a user's browser, executing code downloaded from a remote HTTP server. The applet may run in a container, which is provided by a host program, through a plug-in, or a variety of other applications including mobile devices that support the applet programming model. The remote code runs in a restricted "sandbox", which is designed to protect the user from misbehaving or malicious code. Publishers can purchase a certificate with which to digitally sign applets as "safe", giving them permission to ask the user to break out of the sandbox and access the local file system and network. These mechanisms reinforce the protection of contents delivered through such programs. Examples of applets are Java applets and Flash movies. Yet another example is the Windows Media Player applet that is used to display embedded video files in Internet Explorer (and other browsers that support the plug-in). Some plug-ins also allow for displaying various 3D model formats in a web browser, via an applet that allows the view of the model to be rotated and zoomed. Many browser games are applet-based, though some may develop into fully functional applications that require installation. Many alternative technologies to Java applets exist. For example, DHTML, Flash, and Microsoft Silverlight technologies satisfy some of the scope of what is possible with an applet. Another alternative to applets for client side Java is Java Web Start, which runs outside the browser. In addition to the features available to applets, a simple permission box can give Java Web Start programs read and/or write access to specified files stored on the client, and to the client's clipboard.

JVM: Java bytecode are instructions analogous to machine code but intended to be interpreted by a virtual machine (VM) written specifically for the host hardware. Standardized libraries provide a generic way to access host specific features such as graphics, threading and networking.

Java Servlets: a Java Servlet is sometimes informally compared to be "like" a server-side applet, but it is different in its language, functions, and in each of the characteristics. Servlets are server-side Java EE components that generate responses (typically HTML pages) to requests (typically HTTP requests) from clients. A servlet can almost be thought of as an applet that runs on the server side—without a face. JavaServer Pages (JSPs) are server-side Java EE components that generate responses, typically HTML pages, to HTTP requests from clients. JSPs embed Java code in an HTML page by using the special delimiters <% and %>. A JSP is compiled to a Java servlet, a Java application in its own right, the first time it is accessed. After that, the generated servlet creates the response.

Widget: a web widget is a portable chunk of code that can be installed and executed within any separate HTML-based web page by an end user without requiring additional compilation. They are derived from the idea of code reuse. A widget engine is a software service available to users for running and displaying desktop widgets on the desktop. Each desktop widget is a stand-alone, task-oriented application which can be composed of several related interactions on its own. A single host software system, such as a web browser, runs all the loaded widgets. This allows several desktop widgets to be built sharing resources and code. Of course, as any program code, widgets can be used for malicious purposes and may pose security issues.

A widget is anything that can be embedded within a page of HTML, i.e., a web page. A widget adds some content to that page that is not static. Applications can be integrated within a third party website by the placement of a small snippet of code. The code brings in 'live' content such as advertisements, links, images from a third party site without the web site owner having to update or control. End users can utilize Web Widgets to enhance a number of web-based hosts, or drop targets. Categories of drop targets include social networks, blogs, wikis and personal homepages.

Other terms used to describe web widgets include: gadget, badge, module, webjit, capsule, snippet, mini and flake. Web widgets usually but not always use DHTML, JavaScript, or Adobe Flash. Widgets often take the form of on-screen tools (clocks, event countdowns, auction-tickers, stock market tickers, flight arrival information, daily weather etc.). Widgets are now commonplace and are used by bloggers, social network users, auction sites and owners of personal web sites. They exist on many home page sites. Most mobile widgets are like desktop widgets, but for a mobile phone.

Intermediate generalizations are now discussed.

This disclosure is a technique to display ads on the user's screen, with such a method that it becomes very difficult if not impossible for such adblockers to be efficient.

Usually one or a plurality of advertisements (ads) are inserted into a web page which is delivered by the web server. Specialized adservers can insert these ads themselves or the web server can insert it at the origin. The data is received by the client, provided with a web browser. The data is parsed, then is displayed on the screen to the end user. It is observed that in some cases the content is not required to be completely parsed in order to be displayed. In particular, adblockers are able to scan the page before it is given for display to the browser and they are thus able to remove the ads before any display.

In the web page sent to browser, two kinds of contents are present: the content asked by the user and the advertisement content. In other words, there are both the content, links and images that the user is looking for, and in addition there are the content, links and images of the advertisement. This distinction allows the adblockers to remove the ads' parts and to keep the other parts.

According to an embodiment of the invention, the requested content is not delivered explicitly in the downloaded web page, but is delivered indirectly. This indirect delivery, in a certain embodiment of the invention, is performed by means of a Java program executed in the virtual machine of the browser. For example, this does correspond to a Java applet program. The Java program is the advertisement itself. Then, at the end of the execution of the program (meaning that the advertisement is supposed to have been displayed on the screen to the user), the program gives access to the content that the user was initially looking for.

There is disclosed a method of handling contents of an interpreted mark-up file, the method comprising the steps of: upon requesting a first content, receiving a first generated program associated with the first content; executing the first generated program, the execution displaying a second content such as a predetermined advertisement and releasing a first key; receiving the first content associated with the first key. There is disclosed a method further comprising the step of displaying the first content. There is further a method wherein the first key is obfuscated in the set of instructions of the generated program.

The invention thus combines an indirect delivery of the desired content and a prior delivery of the advertisement, the delivery being a conditional access to the desired content.

According to embodiments of the invention, it is ensured that explicit information about the address of the target web page is never given to the browser before the ad is ended. By doing so, all adblocking techniques are defeated.

According to other embodiments of the invention, specific mechanisms ensure that it is not possible for an adblocker to simulate or falsify or fake the behaviour of the considered program to bypass its conditional content, by getting from the web server the final information (such as the network address, content characteristics, possible substitutions, category, etc.) about the user desired content page.

In the event of the user stopping the program (requiring the ad's display), the user will be prevented to access the desired content. For the previous reason the user will not be able to bypass the content.

It should be noted that caching techniques will inoperant. A first user accesses the desired content, after the required display of the ad. A second user can intercept or otherwise receive the final address of the desired content and try to get a direct access to it, without even displaying the required ad.

Certain embodiments of the invention can be seen as being a synergy between technologies not related at first sight: a technique of generation of programs and generation of keys providing access to the contents and optionally to the generations of images.

According to a certain embodiment, there is provided a system to selectively secure the display of advertisements. The system involves a web server, a proxy server and a client browser. In response to a first client browser query, the proxy server requests the corresponding mark-up file from the web server. Upon reception of the mark-up file, the proxy server interprets the mark-up file in the browser, gets the DOM tree and transforms a part of the interpreted (executed) mark-up file into a program. The proxy server then constructs a modified mark-up file containing the program resulting in a modified DOM tree. In the end, the client web browser displays and interprets the modified mark-up file.

According to particular embodiments of the invention, interpreting (or rendering) a mark-up file in a viewer or a browser defines (or renders) the displayable elements of the mark-up file. An interpreted mark-up file can be entirely of partly "frozen" into a program conditionally executing. In other words, it is possible to replace some areas or subparts of an interpreted mark-up file by its associated image(s) displayed through the execution of one or a plurality of programs. Both the original and the modified mark-up file will look identical when interpreted (rendered), but scripting languages codes will be very different.

The modified mark-up file indeed contains a modified scripting language code associated with the newly generated program. In addition, the image displayed during the execution of the generated program can be further transformed (the image can be divided, randomly or not, greyscaled, etc). This flexible "freezing" is achieved thanks to manipulation of the DOM tree of the mark-up file. Given a subpart of the interpreted mark-up file to be "frozen", the DOM tree of the mark-up file is analyzed. Children nodes corresponding to this subpart are defined. Then parent nodes comprising these children nodes are also defined. One parent node is chosen and the set of displayable elements corresponding to this parent node is converted to an image displayed by a generated program. The chosen parent node is replaced by a node calling the program, thus leaving unchanged (or not) the layout of the interpreted mark-up file.

According to another embodiment of the invention, there is disclosed a method to view internet content, a program being generated at a remote proxy server and the program when executing displaying a modified web page from the original one, the web page containing text and graphics.

In an embodiment, a mark-up file is an HTML (hyper-text mark-up language) or PHP page, but it is observed that much wider cases may be envisaged. Indeed, the disclosure equally applies to other environments than the World Wide Web. It is thus intended that the scope of the invention covers all forms of electronic communications.

By definition, the disclosed technique applies for any kind of mark-up file or digital contents, whatever is the environment (computer desktop, mobile phone, smart phones, PDA, wearable computer, augmented reality, etc). For example, the technique applies to WML pages, in mobile/wireless environments. The invention covers all known mark-up languages, such as XHTML (well-formed XML), DocBook, MathML, SVG, Open eBook, TEI, XBA, SGML, XML as well as other systems explicitly designed to support descriptive mark-up languages. It is observed that most browsers natively support a variety of formats in addition to HTML, and can be extended to support more through the use of plug-in. Similarly the disclosure can be applied to many technologies including current web interface developments. For example, to web pages comprising Applets in Java which can be executed on web pages thanks to a JVM (Java Virtual Machine), to web pages comprising RIA (Rich Internet Applications) which can be developed in AJAX (Asynchronous JavaScript and XML), and/or by using technologies like Flash or WPF/E (requiring adapted plug-in). And at last, to web interfaces which now use RDA (Rich Desktop Applications) requiring a virtual machine (Eclipse RCP, NetBeans, Java Web Start, Mozilla XULRunner, Adobe AIR or Microsoft SmartClient) or working with technologies such as Flash/Flex/ActionScript or HTML/Javascript/CSS/AJAX. It is reminded that XUL is an XML language based on W3C standard XML 1.0. Applications written in XUL are based on additional W3C standard technologies featuring HTML 4.0; Cascading Style Sheets (CSS) 1 and 2; Document Object Model (DOM) Levels 1 and 2; JavaScript 1.5, including ECMA-262 Edition 3 (ECMAscript); XML 1.0.

According to certain embodiments, the described approach is not restricted to pure web environments. For example electronic messaging can implement embodiments of the invention (email clients do receive a lot of advertisements, whose effective display is intended to be secured by senders). Emails (electronic messages), since they can be in HTML format, are then also covered. According to other embodiments, the disclosure also applies to application suites rather than merely web browsers: applications also can embed advertisements. Provided that an independent program is able to be executed and to interact with the mark-up file viewer through a communication channel, the present method can be implemented. For example, advertisements can be embedded in pdf viewers (pdf is a de facto standard and advertisements can be adapted to the final user according to the context and contents of the pdf file, among other parameters). According to the paradigm SaaS/Software as a Service, software is delivered through the Internet and any software application can appear as mark-up files (HTML pages). Similarly, gaming environments are more and more provided with embedded advertisements. Adblocking techniques could emerge in these environments and the present disclosure would enable to secure the display of advertisements. According to certain embodiments, the present disclosure indeed addresses all viewers (content from a document may be rendered on a "content rendering application or device". Examples of content rendering applications include an Internet browser (e.g., Explorer or Netscape), a media player (e.g., an MP3 player, a Real Networks streaming audio file player, etc.), a viewer (e.g., an Adobe Acrobat pdf reader), etc.)

According to certain embodiments, the present disclosure is also very valuable to secure so-called mashups. Mashups mix and merge contents (data and code) from multiple content providers in a user's browser, to provide high-value web applications. Web applications increasingly rely on extensive scripting on the client-side (browser) using a readily available client-side JavaScript libraries (and programming paradigm such as AJAX). Mashup developers typically use a web application proxy server which fetches the content from different servers and serves it to the mashup or by directly including code from different origins. By separating and gathering contents, there are risks that enclosed or attached advertisements will be removed or skipped. Native security models of common browser platforms allow content to be separated, i.e. advertisements to be removed. By using the disclosed mechanism of program generation, it is possible to make content non-separable (encapsulating contents), and following to secure the display of advertisements in these mashups environment, too. Associated to these image generation techniques, further code rewriting mechanisms can use Javascript rewriting which can make a combination of static analysis and dynamic code rewriting (due to the self-modifying nature of JavaScript), operations being performed in a rewriting proxy.

Advanced features that can optionally be combined with embodiments of the invention are now discussed.

DOM inspection tools are available on the market. Such tools would greatly benefit from implementing embodiments of the invention. For example, an extension of the Mozilla DOM Inspector could allow to modify and save directly mark-up files, according to embodiments of the invention, i.e., by converting the contents of one or a plurality of nodes into one or a plurality of programs to be executed, modifying the DOM tree and including or calling the generated program (s) directly into the modified mark-up file. Such a development would allow users to "freeze" or "secure in/by programs" parts of their documents. Among many advantages, it would allow users to impede crawling and indexing of program-converted parts of their contents (because spiders or bots do not analyze the pixels of images and because an effective execution of the program is required). It would also allow forbidding any copy/paste operation by final viewers of contents (when mark-up files are delivered).

Another possible use of embodiments of the invention would consist in repairing mark-up files containing errors. If an error is detected (in a script for example), the conversion of the content of the node(s) containing the error into a program according to embodiments of the invention will enable to generate an error-free mark-up file.

Using program generation offers many interesting opportunities since it implies a possible power control on the mark-up file. For example, an program corresponding to a node having been rendered, it would be possible to host the image on a secure server and to require authentication and/or payment for accessing the considered image. It would then be possible to selectively secure parts of a given file with much flexibility. A similar mechanism would implement conditional access to contents or parts of contents according to rights having been previously granted to users or machines.

Other considerations are now discussed.

Rewriting of the DOM tree combined with the generation of programs whose access requires the proper delivery of keys offers many interesting opportunities. For example, it would be valuable to generate a single program (and an associated very simplified DOM tree) and to use it as background screen while superposing a possible video area (in foreground, with a <DIV> tag if the mark-up file were an HTML mark-up file, i.e. an adapted DOM tree). It is possible to imagine a wide range of indirect applications, such as using an program in the foreground with the proper z depth property to disable access to the fast-forward button in an embedded video player to prevent the user from skipping an advertisement in a video (this operation being made temporarily, by refresh for example, or permanently).

Using programs displaying contents previously converted to images present many advantages. The advantage of the use of a program is that it allows to secure the display of advertisements enclosed in mark-up files. Indeed, it defeats all techniques used by so-called adblockers, among which text analysis techniques and image recognition techniques. Because displayable elements containing text have been embedded in a program, no semantic or text filtering tools will be later able to perform any analysis. The comprehensible data for these tools has been simply erased. Still, one might try to perform an OCR analysis (analyzing the result produced by the generated program implies to be able to capture the result and to extract enclosed text), but these tools are very sensitive the quality of the image and do consume a lot of computing resource. An adapted image modification will easily defeat this possibility (by adding noise or by distorting slightly the image, seeking for a compromise between readability for the user and added complexity for OCR or other analysis tools). As per image recognition technologies, they are at very early stage. One might try to isolate image areas from texts areas, and then apply image matching techniques (i.e., comparing isolated images with databases of known advertisement images, to decide whether the isolated images are advertisement images or not). It appears that it is difficult, if not impossible, to detect an advertisement image enclosed in another larger image. The more the surface of the advertisement image is small compared to the total surface, the more image recognition (or matching) performs badly. An advertisement enclosed in a 110% image would be more easily detected and recognized than an ad enclosed in a 400% image (recognition dramatically falls at the threshold 25% in average). Even advanced image recognition technologies, like the so called pattern matching technique (aiming at automatically isolating objects of interest within an image by using edge point detection and other techniques) also fail in practice. Like the use of text analysis techniques, these image recognition technologies are too CPU and memory intensive and thus fail to provide a good solution in real-time or intensive environments. The same analysis may be conducted to product placement in movies (detecting and deleting a brand apparition in a movie will remain impossible for many years). In some situations, the advantage stems from the difficulty to isolate homogeneous areas and consequently to perform efficient image recognition techniques. In other situations, the advantage comes up from the difficulty of gathering adequately images to perform image recognition techniques and text/optical character recognition analysis. Rendering displayable elements through a program into visual results thus introduces many advantages. Depending on an adequate intelligent mapping, the robustness of the system to adblocking techniques may be optimized and the display of advertisement can be greatly secured. Given one or a plurality of areas to be secured, one or another program generation mode will be chosen. In other words, knowing the area where the advertisement is placed (according to data provided by the advertiser for example), it is then possible to optimize the program generation so that image recognition techniques present the lowest possible performance. Such a feature allows interesting business models, since advertisers may pay for additional services (precisely for securing the display of their specific advertisements, for example). It also enables to prioritize the display of DOM nodes (transmitting elements in a sequence according to a display priority. For example the generated program containing the advertisement could be displayed first. Such a feature may be useful when considering bandwidth parameters, etc.). In conclusion, there is provided a further technique of altering one or a plurality of images displayed by the program by distorting, greyscaling, re-encoding, resizing, noising, discretizing, resampling or scrambling.

While the present invention has been described in terms of a system for securing the display of advertisements, it will be appreciate that the inventive concept may be applied equally to a wide range of contents (and not only to advertisements).

There is disclosed a method of delivering digital content to a user interface, the method comprising the steps of generating a starting content on the user interface including at least one clickable content, each of the at least one clickable content being previously associated with a first key; upon selection of a clickable content associated with a first key, determining a second key associated with a destination content from the first key; determining an executable asset program from the second key, the execution of the asset program generating the display of a predefined asset content; attaching the second key to the executable asset program according to an hiding mechanism; executing the executable asset program to display the predefined asset content; and releasing the second key during the execution of the program. The method comprises the further step of displaying the destination content associated with the second key. The method comprises a hiding mechanism which includes inserting or obfuscating the second key in the executable asset program code. The predefined asset content comprises audio, image or video content which may be displayed during a predetermined duration. The predefined asset content is displayed in a full screen mode or it visually hides one or a plurality of areas of the user interface display.

The invention can take the form of an entirely hardware embodiment, an entirely software embodiment or an embodiment containing both hardware and software elements. In an embodiment, the invention is implemented in software, which includes but is not limited to firmware, resident software, microcode, etc. In particular it will be appreciated that the functionality of many of the components of the invention may be implemented by means of software, hardware or firmware of any combination of these. In a high performance system a hardware implementation of the java execution may prove advantageous for example.

Furthermore, the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can contain, store, communicate, propagate, or transport the program for use by or in connection with the instruction execution system, apparatus, or device.

Java and all Java-based trademarks are trademarks of Sun Microsystems, Inc. in the United States, other countries, or both. Java is a trademark of Sun Microsystems. Firefox is a trademark of the Mozilla Foundation. Internet Explorer is a trademark of Microsoft Corp. Google is a trademark of Google Inc. Other company, product or service names may be the trademarks or service marks of others.

The invention claimed is:

1. A method of delivering digital content to a user interface, the method comprising:
generating, using a computer hardware device, a starting content on the user interface including at least one clickable content, each of the at least one clickable content being previously associated with a first key;
upon selection of a clickable content associated with a first key, returning an executable asset program including a sequence of code for displaying a predefined asset content, and wherein a constant value K is embedded in the sequence of code;

determining, using the computer hardware device, a second key based upon the constant K value and associated with a destination content, from the first key;

generating, using the computer hardware device, an executable asset program from the second key, wherein execution of the executable asset program generates a display of a predefined asset content;

attaching, using the computer hardware device, the second key to the executable asset program according to a hiding mechanism, wherein the hiding mechanism uses a plurality of layers of an obfuscation code;

executing, using the computer hardware device, the executable asset program to display the predefined asset content prior to the display of the destination content, wherein the executing includes de-obfuscating the second key, and wherein the de-obfuscating is in response to the completion of the executing; and releasing, using the computer hardware device, the second key during the execution of the program.

2. The method of claim 1, further comprising:
displaying the destination content associated with the second key.

3. The method of claim 1, wherein the hiding mechanism further comprises:
inserting the second key in the executable asset program code.

4. The method of claim 1, wherein the hiding mechanism further comprises:
intricating the second key in the executable asset program code.

5. The method of claim 1, wherein the hiding mechanism further comprises:
determining the executable asset program code to calculate during execution of the second key.

6. The method of claim 1, wherein the predefined asset content comprises audio, image or video content which is displayed during a predetermined duration.

7. The method of claim 1, wherein the executable asset program displays the predefined asset in a full screen mode.

8. The method of claim 1, wherein the executable asset program displays the predefined asset in a mode that visually hides at least one area of the user interface.

9. The method of claim 1, wherein the executable asset program is executed in a virtual machine.

10. A computer program stored on a non-transitory computer readable storage medium for delivering digital content to a user interface when executed by a computing device, the computer program comprising instructions for:

generating a starting content on the user interface including at least one clickable content, each of the at least one clickable content being previously associated with a first key;

upon selection of a clickable content associated with a first key, returning an executable asset program including a sequence of code for displaying a predefined asset content, and wherein a constant value K is embedded in the sequence of code;

determining a second key, associated with a destination content based upon the constant K value and from the first key;

generating an executable asset program from the second key, wherein execution of the executable asset program generates a display of a predefined asset content;

attaching the second key to the executable asset program according to a hiding mechanism, wherein the hiding mechanism uses a plurality of layers of an obfuscation code;

executing the executable asset program to display the predefined asset content prior to the display of the destination content, wherein the executing includes de-obfuscating the second key, and wherein the de-obfuscating is in response to the completion of the executing; and releasing the second key during the execution of the program.

11. The computer program of claim 10, the computer program further comprising instructions for:
displaying the destination content associated with the second key.

12. The computer program of claim 10, wherein the hiding mechanism further comprises:
inserting the second key in the executable asset program code.

13. The computer program of claim 10, wherein the hiding mechanism further comprises:
intricating the second key in the executable asset program code.

14. The computer program of claim 10, wherein the hiding mechanism further comprises:
determining the executable asset program code to calculate during execution of the second key.

15. The computer program of claim 10, wherein the predefined asset content comprises audio, image or video content which is displayed during a predetermined duration.

16. The computer program of claim 10, wherein the executable asset program displays the predefined asset in a full screen mode.

17. The computer program of claim 10, wherein the executable asset program displays the predefined asset in a mode that visually hides at least one area of the user interface.

18. The computer program of claim 10, wherein the executable asset program is executed in a virtual machine.

19. A system of delivering digital content to a user interface, the system comprising:
at least one computing hardware device, including:
a system for generating a starting content on the user interface including at least one clickable content, each of the at least one clickable content being previously associated with a first key;

a system for, upon selection of a clickable content associated with a first key, returning an executable asset program including a sequence of code for displaying a predefined asset content, and wherein a constant value K is embedded in the sequence of code;

a system for determining a second key based upon the constant K value and associated with a destination content, from the first key;

a system for generating an executable asset program from the second key, wherein execution of the executable asset program generates a display of a predefined asset content;

a system for attaching the second key to the executable asset program according to a hiding mechanism, wherein the hiding mechanism uses a plurality of layers of an obfuscation code;

a system for executing the executable asset program to display the predefined asset content prior to the display of the destination content, wherein the executing includes de-obfuscating the second key, and wherein the de-obfuscating is in response to the completion of the executing; and a system for releasing the second key during the execution of the program.

* * * * *